(12) United States Patent
O'Reilly

(10) Patent No.: US 12,548,461 B2
(45) Date of Patent: Feb. 10, 2026

(54) UNTETHERED MOTION SIMULATOR SYSTEMS AND METHODS THEREOF

(71) Applicant: Gimbal Innovations, Inc., Mason, OH (US)

(72) Inventor: Daniel P. O'Reilly, Mason, OH (US)

(73) Assignee: Gimbal Innovations, Inc., Mason, OH (US)

( * ) Notice: Subject to any disclaimer, the term of this patent is extended or adjusted under 35 U.S.C. 154(b) by 0 days.

(21) Appl. No.: 19/256,283

(22) Filed: Jul. 1, 2025

(65) Prior Publication Data

US 2026/0011262 A1 Jan. 8, 2026

Related U.S. Application Data

(60) Provisional application No. 63/667,945, filed on Jul. 5, 2024.

(51) Int. Cl.
| | |
|---|---|
| *G09B 9/02* | (2006.01) |
| *A63G 31/16* | (2006.01) |
| *G09B 9/04* | (2006.01) |
| *G09B 9/06* | (2006.01) |

(Continued)

(52) U.S. Cl.
CPC ............... *G09B 9/02* (2013.01); *A63G 31/16* (2013.01); *G09B 9/04* (2013.01); *G09B 9/06* (2013.01); *G09B 9/12* (2013.01); *G09B 9/52* (2013.01)

(58) Field of Classification Search
None
See application file for complete search history.

(56) References Cited

U.S. PATENT DOCUMENTS

| | | | |
|---|---|---|---|
| 5,251,571 A | 10/1993 | Willinsky et al. | |
| 5,702,307 A | * 12/1997 | Moran | G09B 9/02 |
| | | | 472/60 |
| 9,789,411 B2 | 10/2017 | Masutti | |

(Continued)

FOREIGN PATENT DOCUMENTS

| | | |
|---|---|---|
| HU | P1900237 | 3/2021 |
| PL | 438393 A1 | 1/2023 |

(Continued)

OTHER PUBLICATIONS

Thomas, Shane; International Search Report and Written Opinion of the International Searching Authority; Int'l. App. No. PCT/US2025/036082; Oct. 14, 2025; 14 pages.

Primary Examiner — James B Hull
(74) Attorney, Agent, or Firm — FBT Gibbons LLP

(57) ABSTRACT

A motion simulator system is disclosed that includes a freely rotatable movable frame supported by, but unattached to, a hemispherical base. The movable frame comprises a spherical enclosure constructed from rigid, lightweight materials such as composite materials or interlocking panels, providing unlimited 360-degree rotation in all three rotational degrees of freedom (pitch, roll, and yaw). An internal actuator system coupled to the movable frame controls attitude positioning while the center of rotation remains substantially fixed relative to the base. Low friction engagement between the movable frame and base is achieved through transfer bearings integrated into the base's outer surface or by pressure-vented air cushions. The system enables smooth, continuous rotation of the untethered movable frame for enhanced motion simulation applications.

20 Claims, 19 Drawing Sheets

(51) Int. Cl.
   *G09B 9/12*      (2006.01)
   *G09B 9/52*      (2006.01)

(56) References Cited

U.S. PATENT DOCUMENTS

2019/0388795 A1* 12/2019 Sanchez Animas .. B60B 19/003
2020/0327819 A1  10/2020 Platt

FOREIGN PATENT DOCUMENTS

| PL | 438960 A1 | 3/2023 | |
| WO | 2010089618 A2 | 8/2010 | |
| WO | 2019106363 A1 | 6/2019 | |
| WO | WO-2024107678 A1 * | 5/2024 | ............... G09B 9/12 |

* cited by examiner

UNTETHERED MOTION SIMULATOR SYSTEMS AND METHODS THEREOF

CROSS REFERENCE TO RELATED APPLICATIONS

The application claims priority to U.S. Ser. No. 63/667,945, filed Jul. 5, 2024, the disclosure of which is incorporated herein in its entirety.

BACKGROUND

Motion platforms have found extensive applications in various domains, including flight simulation, virtual reality, entertainment, and training. These platforms aim to provide users with immersive experiences by simulating real-world motion scenarios. Conventionally, motion platforms employ linear or rotary actuators to achieve the desired degrees of freedom (DOF).

Existing motion platform technologies typically offer six degrees of freedom (6-DOF), comprising three rotational degrees and three translational degrees. However, these platforms often face limitations in terms of their range of motion. For instance, most 6-DOF platforms are restricted to a maximum of ±25 degrees in the three rotational axes. This limited motion range can hinder the realism and immersiveness of the simulated experience.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
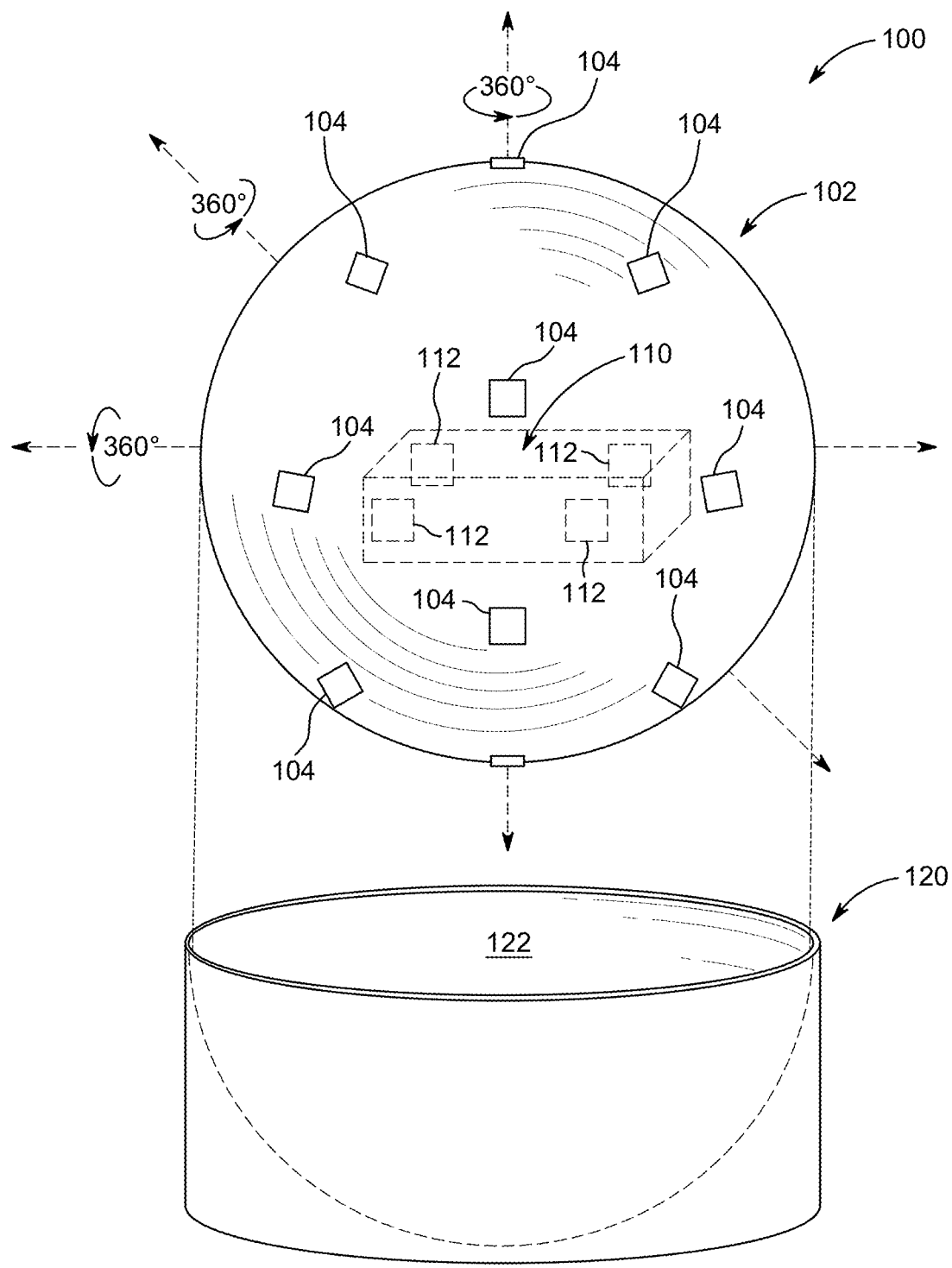
FIG. 1 depicts an example motion simulator system in accordance with one non-limiting embodiment.

Various non-limiting embodiments of the present disclosure will now be described to provide an overall understanding of the principles of the structure, function, and use of the systems and methods disclosed. One or more examples of these non-limiting embodiments are illustrated in the selected examples disclosed and described in detail with reference made to the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems and methods disclosed herein are described in detail by way of examples and with reference to the figures. The examples discussed herein are examples only and are provided to assist in the explanation of the systems and methods described herein. None of the features or components shown in the drawings or discussed below should be taken as mandatory for any specific implementation of any of these the systems or methods unless specifically designated as mandatory. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible.

It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The systems and methods disclosed herein generally relate to a motion simulator system that can include a hemispherical base that supports an untethered movable frame. An internal actuator system coupled to the movable frame can provide attitude positioning of the movable frame through full rotation of the movable frame relative to a base. The attitude of the movable frame refers to its orientation in three-dimensional space, typically described using the three rotational degrees of freedom: pitch, roll, and yaw. Pitch is the angle of rotation about the lateral (side-to-side) axis, representing the movable frame's tilt forward or backward. Roll is the angle of rotation about the longitudinal (front-to-back) axis, indicating the movable frame's tilt side to side. Yaw is the angle of rotation about the vertical axis, describing the movable frame's heading or bearing. The movable frame in accordance with the present disclosure can have unlimited 360 degree motion in all three rotational degrees of freedom.

The movable frame can be constructed using various materials to achieve the desired balance of strength, weight, and durability. For example, a rigid, lightweight composite material such as carbon fiber or fiberglass reinforced plastic, formed into two hemispherical shells can be joined together to form the spherical structure. Alternatively, a spherical structure can be constructed from a series of interlocking panels that are made from high-impact resistant polymers or other suitable materials that are each affixed to an inner frame. The spherical structure can be fully or partially enclosed, with some embodiments including a ventilation system to maintain a comfortable environment during extended use. The spherical structure can utilize include a door, a removable or hinged access panel, a removable or hinged access bar, an open portal, or other approach to provide ingress and egress to its occupant.

The movable frame can be supported by a base but unattached, such that the movable frame can freely rotate with respect to the base in any direction with extremely low friction. During rotation of the movable frame, the center of rotation of the spherical structure can be remain substantially fixed relative to the base. In some embodiments, the base can incorporate structures or features that provide a low friction engagement between the frame and the base. By way of the example, the base can include a plurality of transfer bearings that are integrated into an outer surface of the base that contact the outer surface of the spherical enclosure of the movable frame, thereby allowing the movable frame to rotate relative to the base. Other embodiments can use other techniques for creating a low friction engagement, such as by venting high pressure air through vent holes in the base to create a thin cushion of air between the base and the spherical enclosure.

Additionally, or alternatively, the spherical enclosure can incorporate transfer bearings, or other types of structures to provide a low friction engagement between the sphere and base. In some embodiments, the spherical enclosure can incorporate low friction structures (such as transfer bearings, for example) and the base can also incorporate low friction structures (such a high pressure air cushion system, for example). In some embodiments, the base can incorporate multiple types of low friction structures (such a high pressure air cushion system and transfer bearings, for example).

In one non-limiting embodiment, the movable frame is a geodesic-type of structure that includes a system of rigid links connected to vertex couplings to create a sphere shape. In some embodiments, the rigid links comprise carbon fiber and the vertex couplings comprise a plastic material, although this disclosure is not so limited. Additionally, at least some of the vertex couplings can house transfer bearings, which provide extremely low friction rotational motion of the frame in any direction relative to the base. The base can define a concave hemispherical surface that has a radius similar to the radius of the movable frame, such that the movable frame fits in, but is not mechanically fixed to, the base in any way. This design beneficially allows the movable frame to roll within the hemisphere in any direction, with extremely low friction, while being supported by the plurality of transfer bearings. In some embodiments, the hemispherical surface of the base can be a solid hemispherical shell. In other embodiments, the base can comprise multiple extensions or legs, each of which define at least part of a hemispherical surface. These multiple extensions or legs can collectively receive and support the movable frame. Further, it is to be appreciated that a variety of other approaches can be utilized to provide an untethered movable frame that can rotate with unlimited 360 degree motion relative to a base. Thus, while certain figures described below depict an example geodesic-type structure for the purposes of illustration, this disclosure is not so limited. In some embodiments, for example, the movable frame can include a large spherical enclosure that is fully enclosed or at least partially enclosed. The spherical structure can sit within a base and rotate freely in all directions utilizing any type of suitable low friction engagement with the base, offering unlimited rotation about all axes. Irrespective of its type of construction and low friction interface with the base, the frame can house an internal actuator system, as described below, such that it is completely untethered from the base and rotatable using internally generated torque forces.

The internal actuator system coupled to the movable frame can include a plurality of momentum devices that can selectably generate controlled torque for attitude control of the movable frame. The internal actuator system can be fully self-contained within the movable frame, thereby creating torque from within the movable frame without needing to physically connect or otherwise tether the internal actuator system or the frame to the base or the ground. Moreover, in various embodiments, the internalized torque can be directed into one or more directions simultaneously such that the internalized torque magnitude and direction can be adjusted continuously to provide precise position, velocity, and acceleration control of the frame.

One or more of the momentum devices can be, for example, a control moment gyro (CMG), which is a type of momentum device that utilizes the principle of angular momentum exchange to generate large output torques for attitude control. An example CMG of the present disclosure can include a spinning flywheel (i.e., 6,000-8,000 rpm) that is mounted on a gimbal frame, which can be rotated 360 degrees using a servo motor. When the spinning flywheel is rotated on an axis perpendicular to its spinning axis (called the gimbal axis), a torque is created perpendicular to the plane formed by the flywheel spin axis and gimbal axis. The magnitude of the torque is proportional to the flywheel angular momentum and gimbal axis rotational velocity. The selective rotation of the gimbal frame allows the rotor's angular momentum vector to be tilted in any desired direction. Accordingly, when the gimbal is rotated, the change in the rotor's angular momentum vector induces a torque on the movable frame to which it is coupled. By precisely controlling the gimbal rates of the multiple CMGs of the internal actuator system, the movable frame's attitude relative to the base can be accurately adjusted and maintained. The variable speed CMGs can be oriented and controlled to provide a torque vector in any direction up to a maximum magnitude to provide rotational acceleration, velocity and positioning control in any desired direction. Thus, when the movable frame is placed in and supported by the hemispherical base, the internal actuator system allows for unlimited rotation of the movable frame in all three axes of rotation, either individually or simultaneously.

The internalized, untethered torque generating technique disclosed herein can be used to provide precise, rapid and flexible positioning of the movable frame in one or more rotational degrees of freedom. In some embodiments, the CMGs, and/or other types of momentum devices of the internal actuator system, and associated control electronics are powered by one or more on-board batteries that are coupled to the movable frame. It is to be appreciated however, that additionally or alternatively to CMGs, other types of techniques can be leveraged by the internal actuator system to generate the required torques for attitude control of the movable frame. Non-limiting examples of other techniques that can be used by the internal actuator system include the use of reaction wheels, magnetorquers, fluidic momentum controllers (FMCs), physical driving wheels, and/or mass shifting techniques, and combination thereof, each of which are described below.

Reaction wheels are spinning masses that generate torque through the principle of conservation of angular momentum. When a reaction wheel is accelerated or decelerated, it creates a torque in the opposite direction of its rotational acceleration. This torque can be transmitted to the attached movable frame, causing it to rotate. By precisely controlling the speed and direction of multiple reaction wheels of an internal actuator system of a motion simulator system, the internal actuator system can generate torques about different axes, allowing for attitude control and stabilization of the associated movable frame. Magnetorquers, also known as magnetic torquers, generate torque through the interaction between a magnetic dipole moment and an external magnetic field. By energizing electromagnetic coils, a magnetic dipole moment is created, which experiences a torque when exposed to an external magnetic field. By controlling the current in the coils, the magnitude and direction of the torque can be adjusted to control movement of a movable frame of a motion simulator system. Fluidic momentum controllers (FMCs) utilize the motion of fluid within a sealed system to generate torque. By controlling the flow of fluid through channels and nozzles, torque can be produced in different directions, thereby allowing for control of the movable frame's moment. Physical driving wheels generate torque through the application of forces at the contact points between the wheels and a surface. In some embodiments, the driving wheels can be positioned on the movable frame, the hemispherical base, or a combination thereof. By controlling the speed and direction of rotation of individual wheels, torques can be generated about different axes. Finally, mass shifting works on the principle that moving a mass away from the center of mass of a system creates a torque. The magnitude of the torque depends on the mass being shifted, the distance it is moved, and the acceleration of the mass. By controlling the position and motion of the mass, torques can be generated about different axes, enabling attitude control of a movable frame. Thus, an internal actuator system of a motion simulator platform can incorporate various types of the actuator technologies and actuation techniques, or combinations thereof, without departing from the scope of the present disclosure.

Utilizing on-board power source can enable the movable frame to be completely untethered from the hemispherical base during operation. This power source used to power the internal actuator system can take several forms. One example embodiments utilizes a high-capacity rechargeable battery, such as a lithium-ion or lithium-polymer battery, which can be coupled to the frame and provide power for extended operating sessions. These batteries can be swapped out when depleted, for example. Alternatively, the system can utilize a rechargeable battery that remains integrated within the frame and can be recharged in situ. In another embodiment, the motion simulator system can be equipped with an inductive charging system.

Furthermore, in some example embodiments, a motion simulator system in accordance with the present disclosure can comprise a plurality of nested gimbal frames coupled to a base structure. These nested gimbal frames can include an outer gimbal frame, an intermediate gimbal frame, and an inner gimbal frame. Each frame can be rotatably coupled to an adjacent frame along a respective rotational axis, allowing the inner gimbal frame to rotate relative to the base structure about three orthogonal axes. This configuration enables unlimited 360-degree motion in all three rotational degrees of freedom. As provided below, a low-friction interface, such as bearings, may be provided between at least one of the gimbal frames and the base structure to facilitate rotation. This arrangement allows for smooth and unrestricted movement of the nested gimbal frames. An internal actuator system can be coupled to the inner gimbal frame that is configured to produce controllable torque vectors. These torque vectors may be used to selectively induce rotation of the gimbal frames about their respective axes.

Furthermore, while motion simulation techniques provided by the motion simulator system described herein can be used in a variety of implementations, in one example embodiment, the motion simulator system can be used to position a human seated within the movable frame to replicate the motion of a vehicle for simulation purposes. As is to be appreciated, a range of vehicle simulation can be provided, such as aircraft (e.g. airplane, helicopter, glider, etc.), spacecraft, military craft (terrestrial and airborne), automotive, marine (e.g. boat, jet-ski, submarine, etc.), thrill ride (e.g. rollercoaster, etc.), among others. Additionally, motion simulator systems can be used in a variety of use cases, such as an amusement park attraction, robotic positioning of objects, the medical field (e.g., positioning of surgical instrument or camera; positioning, rotation of patient for various procedures, treatments, etc.), camera and/or object positioning and rotation for unique visual effects in the film and entertainment industry, and so forth.

In accordance with some embodiments, the motion simulator system described herein can provide a highly immersive and realistic experience by seamlessly integrating physical motion with visual stimuli. For example, the user of the motion simulator system can be equipped with a virtual reality (VR) system, such as a head-mounted display. The physical movement of the motion simulator system can be synchronized with the virtual movements experienced by the user within the VR environment. In addition to VR integration, the motion simulator system can also be used in conjunction with traditional visual displays or monitors. In these embodiments, the motion simulator system or its surrounding physical environment can incorporate screens, projectors, or other display devices to present visual information to the user. The content displayed on these screens can be synchronized with the physical movement of the motion simulator system, providing a cohesive and immersive experience. As it to be appreciated, the integration of VR systems and visual displays with the motion simulator system can provide a wide range of possibilities for various applications. In training and education, realistic simulations can be created to prepare individuals for real-world scenarios, such as flight training, emergency response, or heavy machinery operation. In entertainment and gaming, the motion simulator system can provide high levels of immersion with real-time physical feedback.

With regard to performance and operational parameters, in some embodiments, a motion simulator system in accordance with the present disclosure can have full and unlimited 360 degree motion in all three rotational axes with a rate of up to 150 degrees/second in each axis. In some embodiments, acceleration can be up to 400 degrees/second$^2$ in each axis. These rates and acceleration can emulate high performance aircraft characteristics, for example.

Moreover, in some embodiments, the motion simulator system can be configured to provide 1 to 3 linear degrees of freedom (DOFs) in addition to the rotational DOFs provided by the movable frame. For example, the motion simulator system can include six linear actuators positioned between the base and a ground plate or other supporting structure. The six linear actuators can be arranged in pairs, with each pair connected to the base and the ground plate through universal joints or ball-and-socket joints. Such arrangement can be similar to a Gough-Stewart hexapod, also known as a Stewart platform, for example. This configuration allows the base and movable frame to have additional DOFs, including up to three translational movements (surge, sway, and heave). A motion simulator that can provide one or more translational movements in addition to three rotational movements can offer a more immersive and realistic experience for the user. By incorporating all six degrees of freedom, a motion simulator in accordance with the present disclosure can recreate a wider range of motion cues and provide a more accurate representation of the simulated environment.

Figure 3:
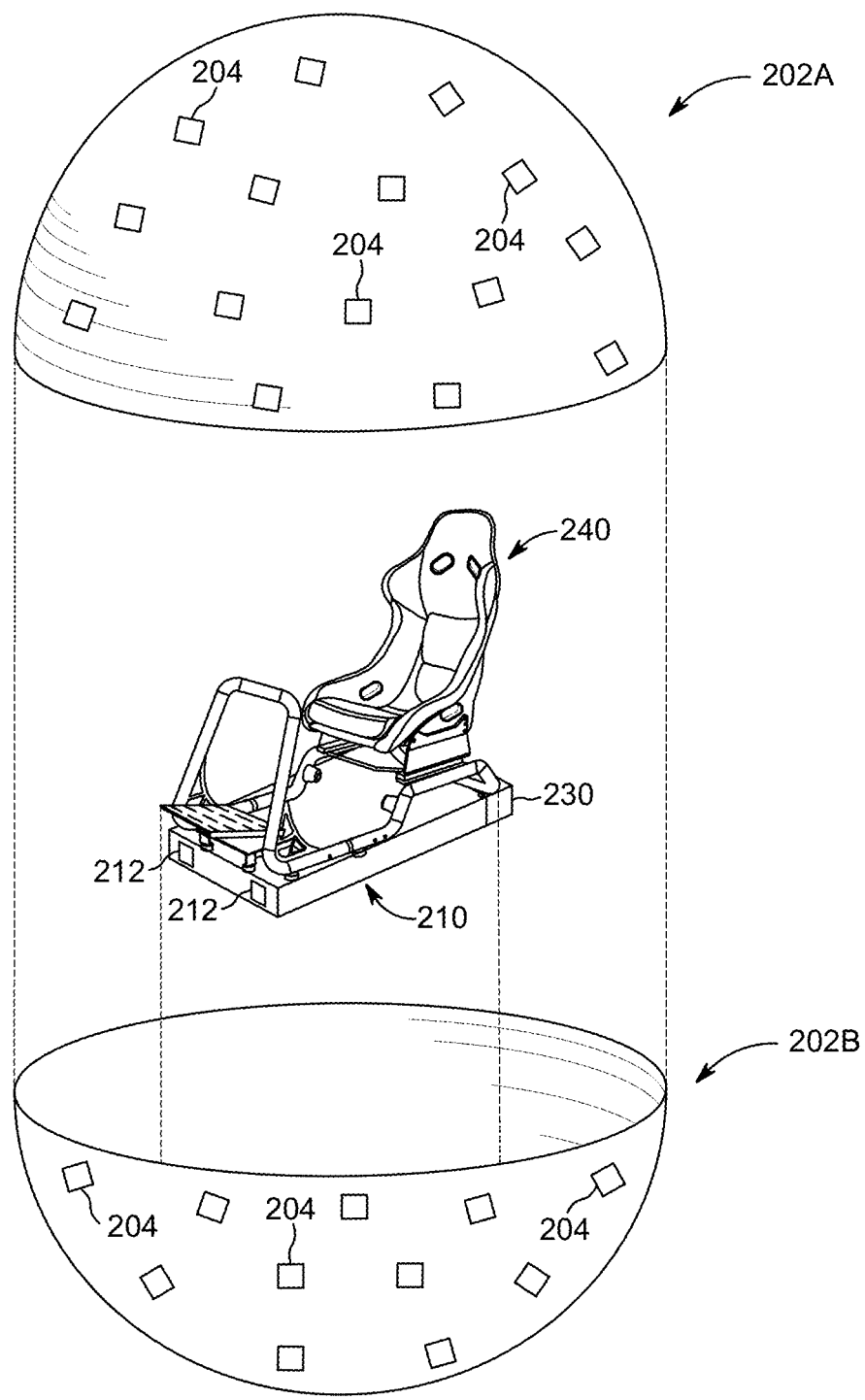
FIG. 3 is an exploded view of an example frame of a motion simulator system in accordance with one non-limiting embodiment.

Referring now to FIG. 1, an exploded view of an example motion simulator system 100 in accordance with one non-limiting embodiment is depicted. The motion simulator system 100 can include a base 120 defining a concave surface 122. The motion simulator system 100 can also include a frame 102 which, when in an operational position (as shown in FIG. 3, for example) rests on the concave surface 122 of the base 120. In some embodiments, the frame 102 can comprise a plurality of transfer bearings 104, or other suitable types of low friction structures, disposed on its outer periphery. In the operational position, a portion of the frame 102 sits nestled within the base 120, as illustrated by the nested portion 518 in FIG. 8. The transfer bearings 104, which extend outward from the frame 102, can make direct contact with the concave surface 122 of the base 120 and can provide a low friction interface between the frame 102 and the concave surface 122. This low friction engagement allows the frame 102 to rotate freely with respect to the base 120 in any direction in a smooth and fluid motion.

The configuration of the motion simulator system 100 can accommodate continuous rotational motion of the frame 102 in any direction. As the frame 102 rotates with respect to the base 120, the specific portion of the frame that is nested within the base constantly changes. Consequently, the particular transfer bearings 104 that are in contact with the concave surface 122 also change continuously during operation. At any given moment, only a subset of the total number of transfer bearings on the frame will be in contact with the base's concave surface 122. As the frame rotates, some bearings will come into contact with the surface while others will lose contact. This continuous change in the contact points between the frame 102 and concave surface 122 through the transfer bearings 104 offers several advantages. It distributes wear evenly across all bearings, potentially extending the lifespan of these components. It also ensures that the frame 102 maintains stable contact with the base 120 regardless of its orientation, contributing to the system's overall stability.

Figure 2:
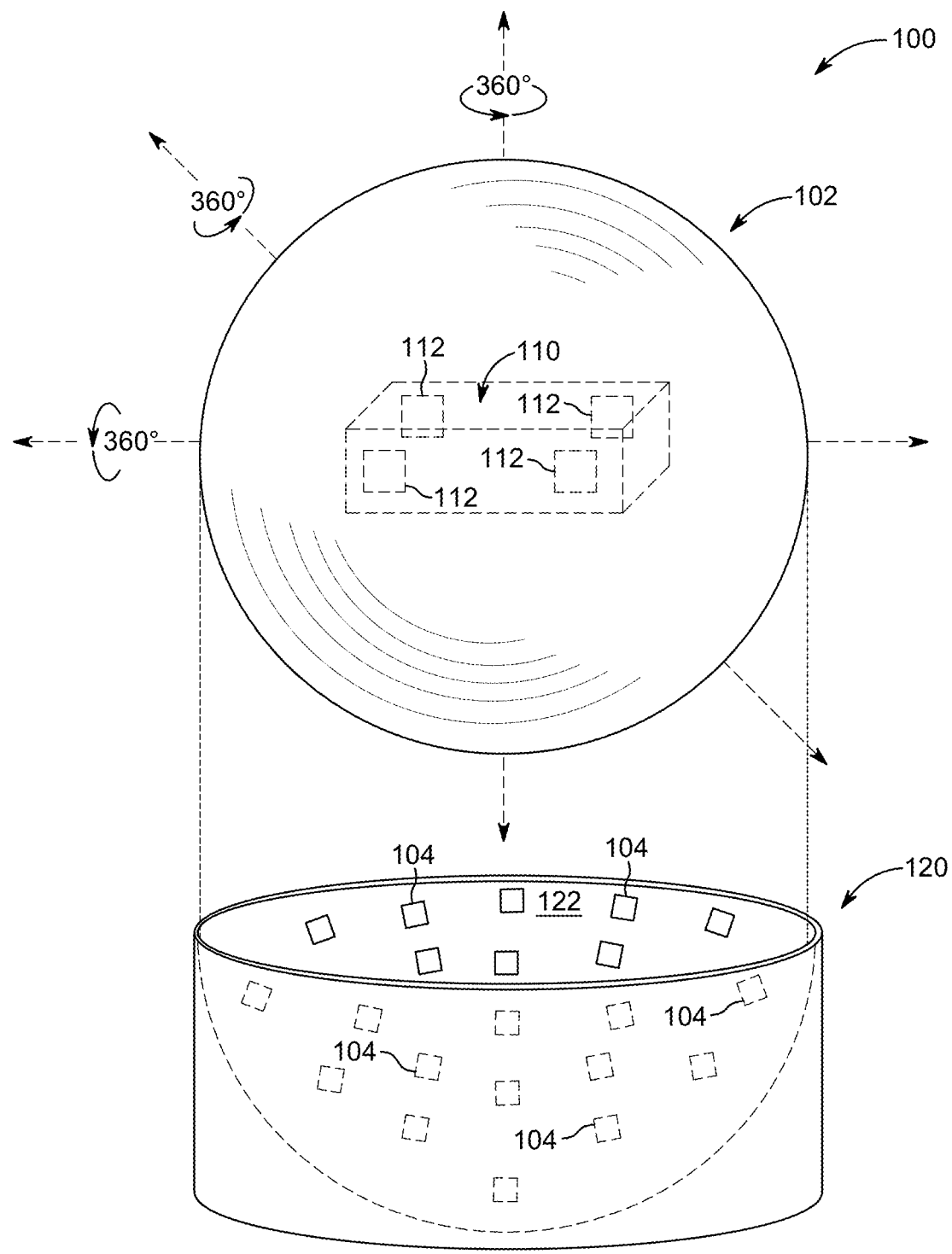
FIG. 2 depicts another example motion simulator system in accordance with one non-limiting embodiment.

Furthermore, transfer bearings 104 are specifically configured to support the weight of the frame 102 and its contents while still allowing for smooth multi-axis rotation relative to the base 120. The material, size, and specific type of bearings used can be selected based on factors such as the expected load, desired rotational speed, and required durability. Also, the concave surface 122 of the base 120 can be engineered to match the curvature of the frame 102, ensuring consistent contact and smooth motion regardless of the frame's orientation. The surface material and finish of the concave surface 122 can be chosen to optimize the interaction with the transfer bearings 104, balancing factors such as friction, wear resistance, and noise reduction. In some embodiments, for example, the concave surface 122 is comprised of carbon fiber. Furthermore, while the transfer bearings 104 are shown positioned on the frame 102 in FIG. 1 for the purposes of illustration, this disclosure is not so limited. FIG. 2, for example, depicts the motion simulator system 100 with the transfer bearing 104 positioned on the concave surface 122 of the base 120.

The motion simulator system 100 can comprise an internal actuator system 110 that is positioned within an interior chamber defined by the frame 102. The internal actuator system 110 can be coupled to the frame 102 and comprise a plurality of momentum devices 112. While FIG. 1 schematically shows four momentum devices 112 for the purposes of illustration, this disclosure is not so limited. Each of the plurality of momentum devices 112 can generate, for example, a controllable torque vector that can collectively cause rotation of the frame 102 relative to the base 120 in three rotational degrees of freedom at a desired rotational speed.

Referring now to FIG. 3, an exploded view of an example frame 202 is depicted in accordance with one non-limiting embodiment. In the illustrated embodiment, the frame 202 is a sphere with transfer bearings 204 coupled to the periphery of the sphere. In one example, the frame 202 is a two-part structure, composed of two hemispheres, which are designated as hemispherical frame 202A and hemispherical frame 202B in FIG. 3. This bi-hemispheric design can aid in the motion simulator system's installation and transportation, for example. The individual hemispherical frames 202A and 202B can be sized to fit through conventional doorframes, allowing for installation of the motion simulator system in pre-existing structures, including residential houses, for example.

In some embodiments, the frame 202 can define an inner chamber be sized to hold at least one occupant with an occupant restraint system 240 that is coupled to the frame 202. The example occupant restraint system 240 of FIG. 3 is shown to include a five-point harness seat. The five-point harness can include two shoulder straps, two lap straps, and a crotch strap, all meeting at a central buckle at the lower abdomen. This harness system can be adjustable to accommodate various body sizes and ensure a snug fit for all users of the motion simulator system.

While the occupant restraint system 240 is shown to include a single seat n in FIG. 3 for the purposes of illustration, motion simulator systems in accordance with the present disclosure can include various seating arrangements within the inner chamber. In some embodiments, for example, multiple seats can be positioned within the inner chamber in any of a variety of different configurations, such as rows, columns, and so forth. For instance, a two-seat configuration could be implemented with seats positioned side-by-side, allowing for simultaneous experiences for two occupants. Alternatively, a front-and-back arrangement could be used, simulating the seating in some vehicles or aircraft. For larger capacity motion simulator systems, multiple rows of seats could be used, similar to the seating arrangement in a small theater or aircraft cabin. In yet other embodiments, seats could be arranged in a circular or semi-circular pattern, facing either inward or outward, which can be advantageous for certain types of simulations or virtual experiences. The number and arrangement of seats can be selected based on the specific application of the motion simulator system. Furthermore, in some embodiments, other types of occupant restraint systems 240 can be used, such as restraint systems that allow occupants to be positioned in a generally standing configuration using a saddle and an over-the-shoulder restraint, for example. In other embodiments, the occupant restraint system 240 can be configured to retain an occupant in a prone position or a supine position.

As schematically shown in FIG. 3, an internal actuator system 210 can be coupled to the frame 202 within the inner chamber. In FIG. 3, the internal actuator system 210 is depicted as positioned beneath the seat 246. However, this configuration is just one example arrangement, and this disclosure is not limited to any specific positioning. Depending on the design requirements, weight distribution considerations, or specific application needs, the internal actuator system 210 could be positioned in various locations within the inner chamber or split amongst multiple locations within the inner chamber. The illustrated internal actuator system 210 includes four momentum devices 212, two of which are shown in FIG. 3. These momentum devices 212 are collectively capable of producing the necessary torque vectors to rotate the frame 202 in multiple directions to generate the motion of the simulator. The use of multiple momentum 212 devices allows for precise control over the simulator's motion, enabling it to create complex movement patterns, for example. These momentum devices 212 could take various forms, such as reaction wheels, control moment gyroscopes (CMGs), or other torque-generating mechanisms. The specific type and number of momentum devices 212 utilized can be based on factors such as the desired motion capabilities, power requirements, and overall system design. For example, a system designed for high-fidelity flight simulation might require more powerful or numerous momentum devices 212 compared to a system intended for less dynamic experiences.

As shown in FIG. 3, a power source 230 can also be coupled to the frame 202 within the inner chamber. The use of an internal power source enables the untethered operation of the internal actuator system 210. More specifically, by housing the power source 230 within the frame 202, the internal actuator system 210 can operate independently, without the need for external power cables that could restrict its motion. The power source 230 could be implemented in various ways, such as high-capacity rechargeable batteries, fuel cells, or other compact energy storage solutions.

Figure 4:
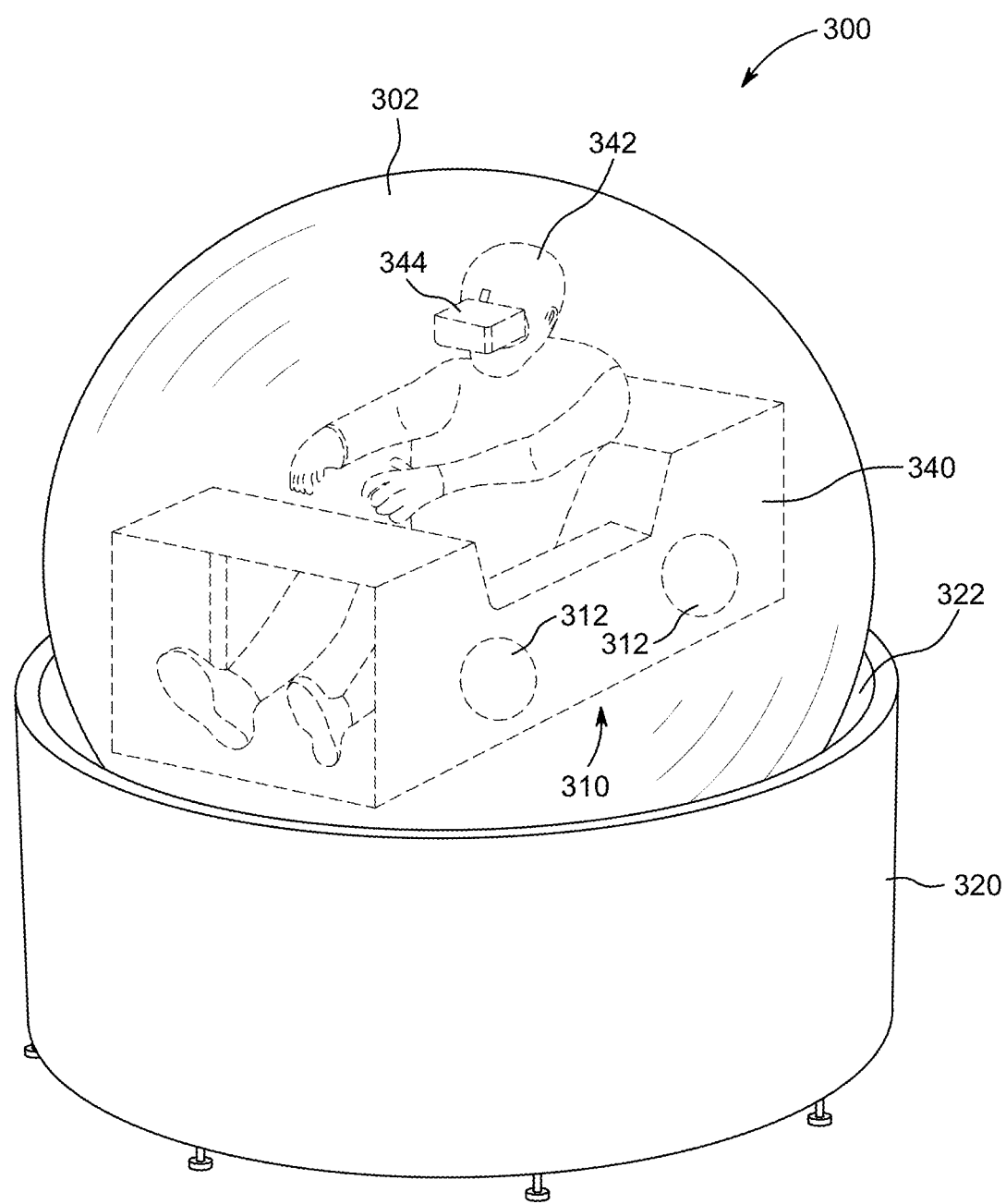
FIG. 4 is a perspective view of an example motion simulation system in accordance with one non-limiting embodiments.

FIG. 4 provides a perspective view of an example motion simulator system 300 having a frame 302 and a base 320 in accordance with one example embodiment. A seat 340 is shown internally positioned within the frame 302. The frame 302 is rotatable relative to the base 320 thereby allowing a wide range of motion sensations to be generated for an occupant 342 of the seat 340. The frame 302 can rotate in multiple axes, allowing for movements that can simulate various scenarios for the occupant 342. Momentum devices 312 of an on-board internal actuator system 310 can selectably generate the required torque vectors to rotate the frame 302 in the desired direction at the desired speed. In the illustrated embodiment, the occupant 342 is shown wearing a virtual reality (VR) headset 344, thereby providing a fully immersive experience. The VR headset 344 can provide the visual component of the simulation, working in tandem with the physical motions of the frame 302 to create a cohesive and realistic experience. As the frame 302 moves, the visual input from the VR headset 344 can be precisely synchronized with these physical motions. For example, if the simulation is replicating a flight experience, as the frame 302 tilts to simulate the aircraft banking, the visual scene presented in the VR headset 344 would shift correspondingly, providing the occupant 342 with a blend of visual and physical cues that mimic real flight.

The frame 302 and/or the base 320 can include a plurality of low friction structures (not shown), such as transfer bearings. In some embodiments, the base 320 can provide a foundation for the rotating frame 302, have a smooth concave surface 322 allowing for smooth, low-friction movement of the frame 302 with transfer bearings mounted to the frame 302 freely rolling along the surface.

Figure 5:
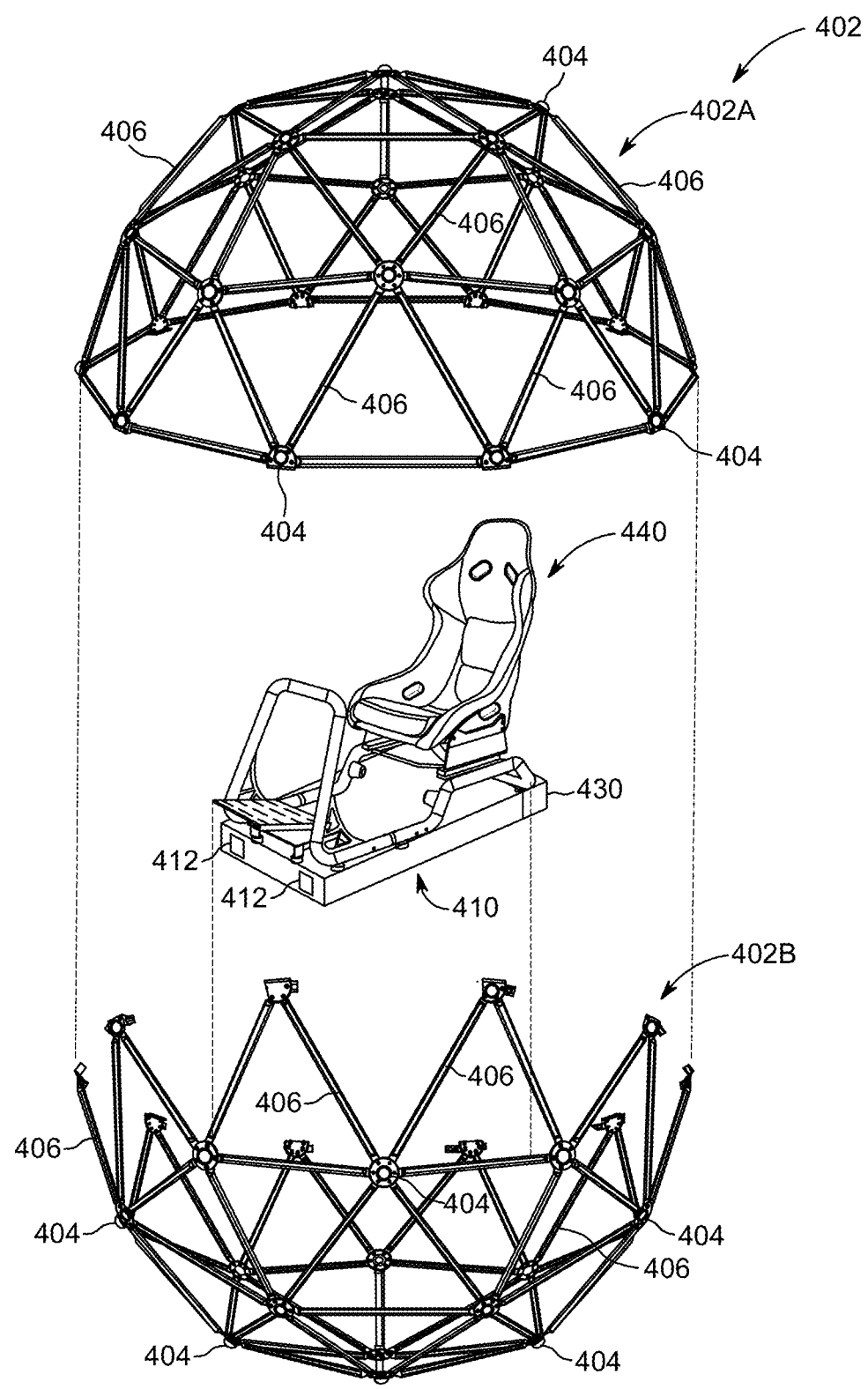
FIG. 5 is an exploded view of an example frame of a motion simulator system in accordance with one non-limiting embodiment.

Referring now to FIG. 5, an exploded view of another example frame 402 is depicted in accordance with one non-limiting embodiment. In the illustrated embodiment, the frame 402 is shown as a two-part structure, composed of two hemispheres, which are designated as hemispherical frame 402A and hemispherical frame 402B. This bi-hemispheric design can aid in the motion simulator system's installation and transportation, for example. The individual hemispherical frames 402A and 402B can be sized to fit through conventional doorframes, allowing for installation of the motion simulator system in pre-existing structures, including residential houses, for example.

In the illustrated embodiment, the frame 402 is constructed using a plurality of rigid links 406. These links are the primary structural elements that give the frame 402 its shape and strength. When the hemispherical frames 402A and 402B are joined, the rigid links 406 collectively assemble into a sphere-like shape. As shown, a plurality of transfer bearings 404 can be coupled to the periphery of the frame 402. In the illustrated embodiment, the transfer bearings 404 are positioned at the vertices of the rigid links 406. In some embodiments, a transfer bearing is positioned at each vertex, while in other embodiments transfer bearings are not positioned at each vertex. In some embodiments, the frame 402 can comprise ten or more transfer bearings 404.

In other embodiments, the frame 402 can comprises twenty-eight transfer bearings 404. In yet other embodiments, the frame 402 can comprises twenty-eight vertices and twenty-eight transfer bearings 404.

In some embodiments, the frame 402 can define an inner chamber be sized to hold at least one occupant with an occupant restraint system 440 that is coupled to the frame 402. While a single seat 446 is shown in FIG. 5 for the purposes of illustration, motion simulator systems in accordance with the present disclosure can be configured with a variety of different seating arrangements, as provided above As schematically shown in FIG. 5, an internal actuator system 410 can be coupled to the frame 402 within the inner chamber. In FIG. 5, the internal actuator system 410 is depicted as positioned beneath the seat 446, similar to the arrangement depicted in FIG. 3. The illustrated internal actuator system 410 includes four momentum devices 412, two of which are shown in FIG. 5, which can collectively produce the necessary torque vectors to rotate the frame 402 in multiple directions to generate the motion of the simulator. The momentum devices 412 can be, for example, reaction wheels, control moment gyroscopes (CMGs), or other torque-generating mechanisms. A power source 430 can also be coupled to the frame 402 within the inner chamber and configured to provide operational power to the internal actuator system 410. The power source 430 can be any suitable power source such as a rechargeable battery, fuel cell, among others. The power source 430 can also provide power to any other onboard devices or components that require power, such as display screens, lighting, sound systems, ventilation systems, and so forth.

Figure 6:
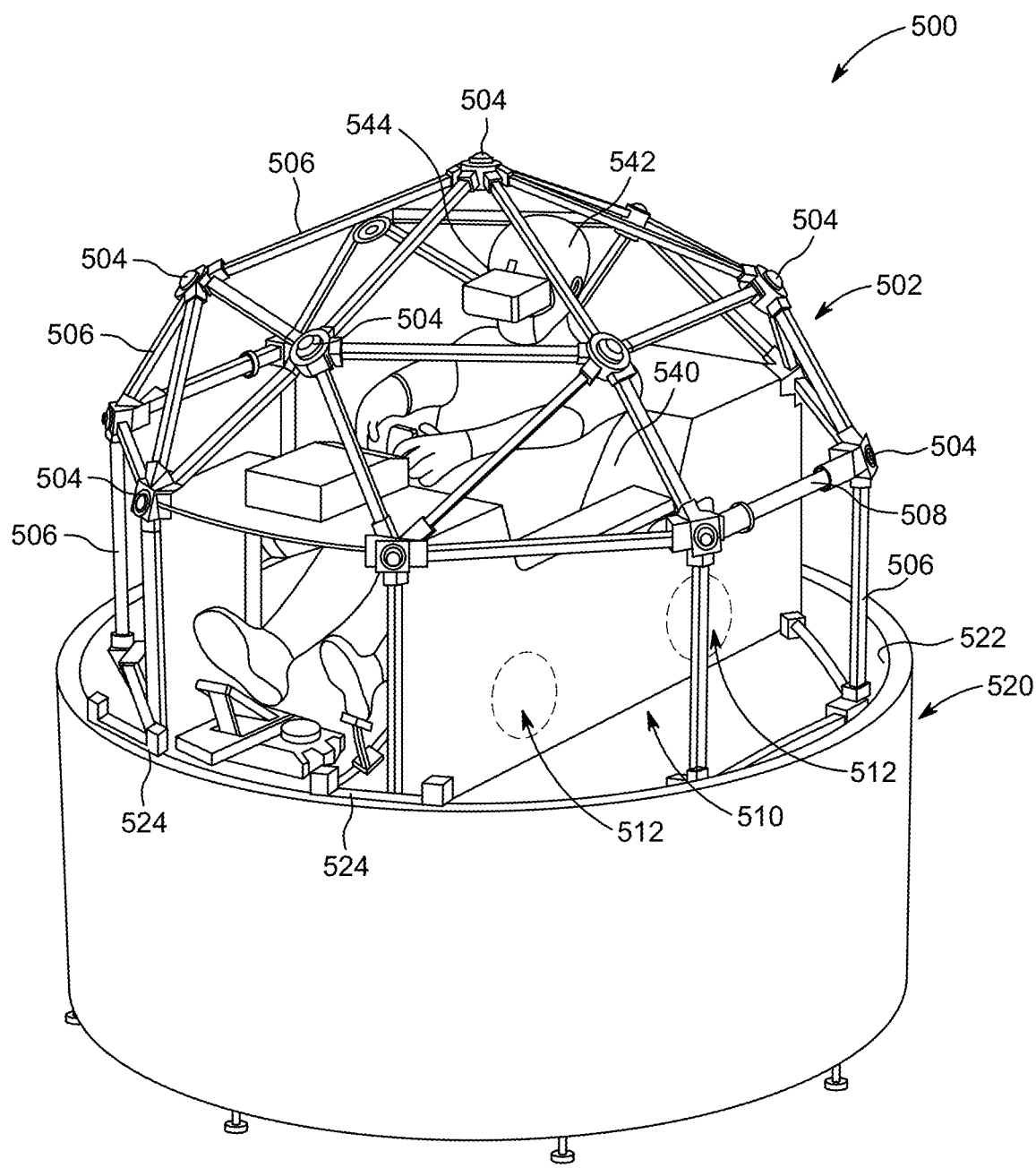
FIG. 6 is a perspective view of an example motion simulation system in accordance with one non-limiting embodiments.
Figure 7:
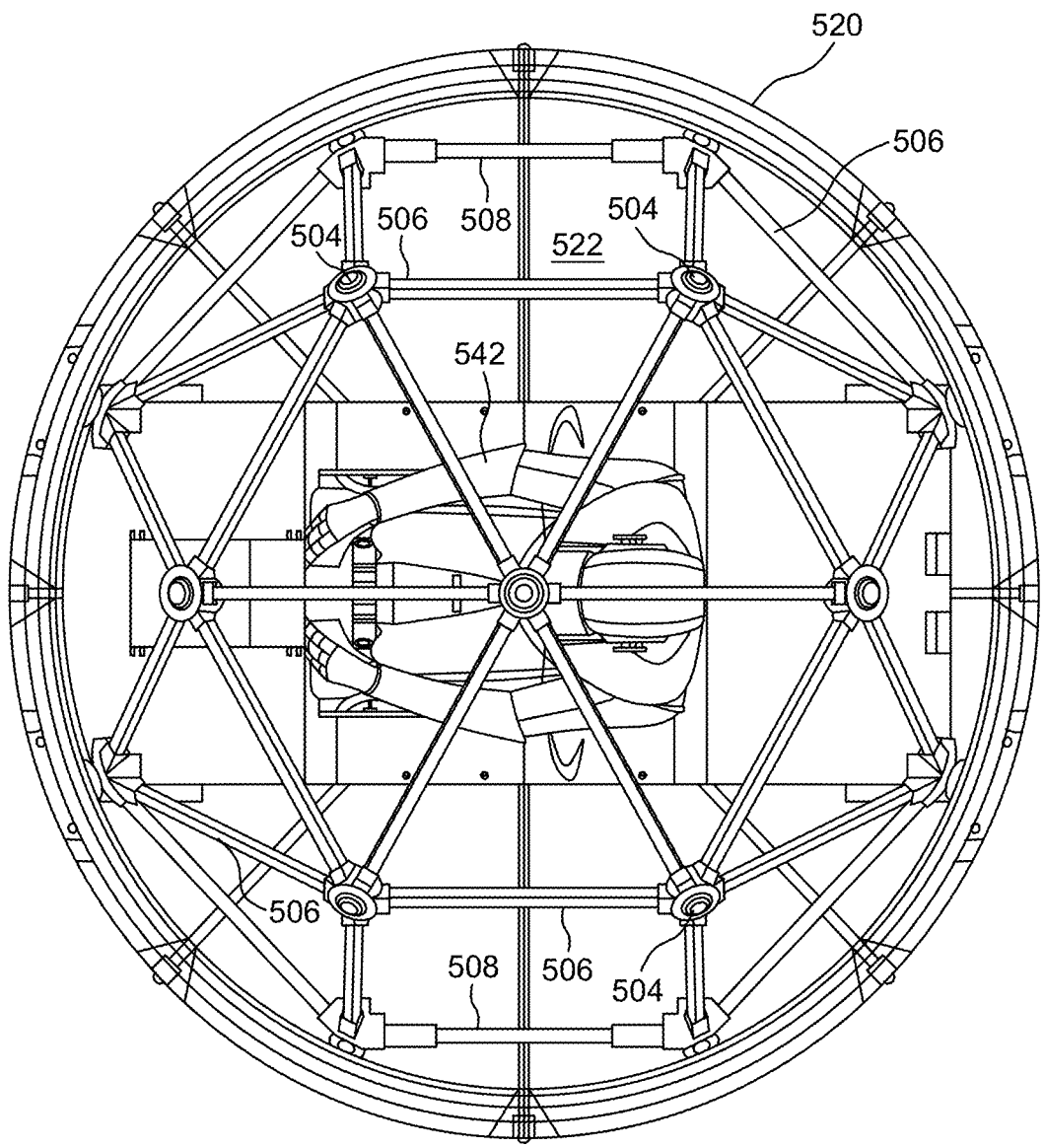
FIG. 7 is a top view of the motion simulation system of FIG. 6.
Figure 8:
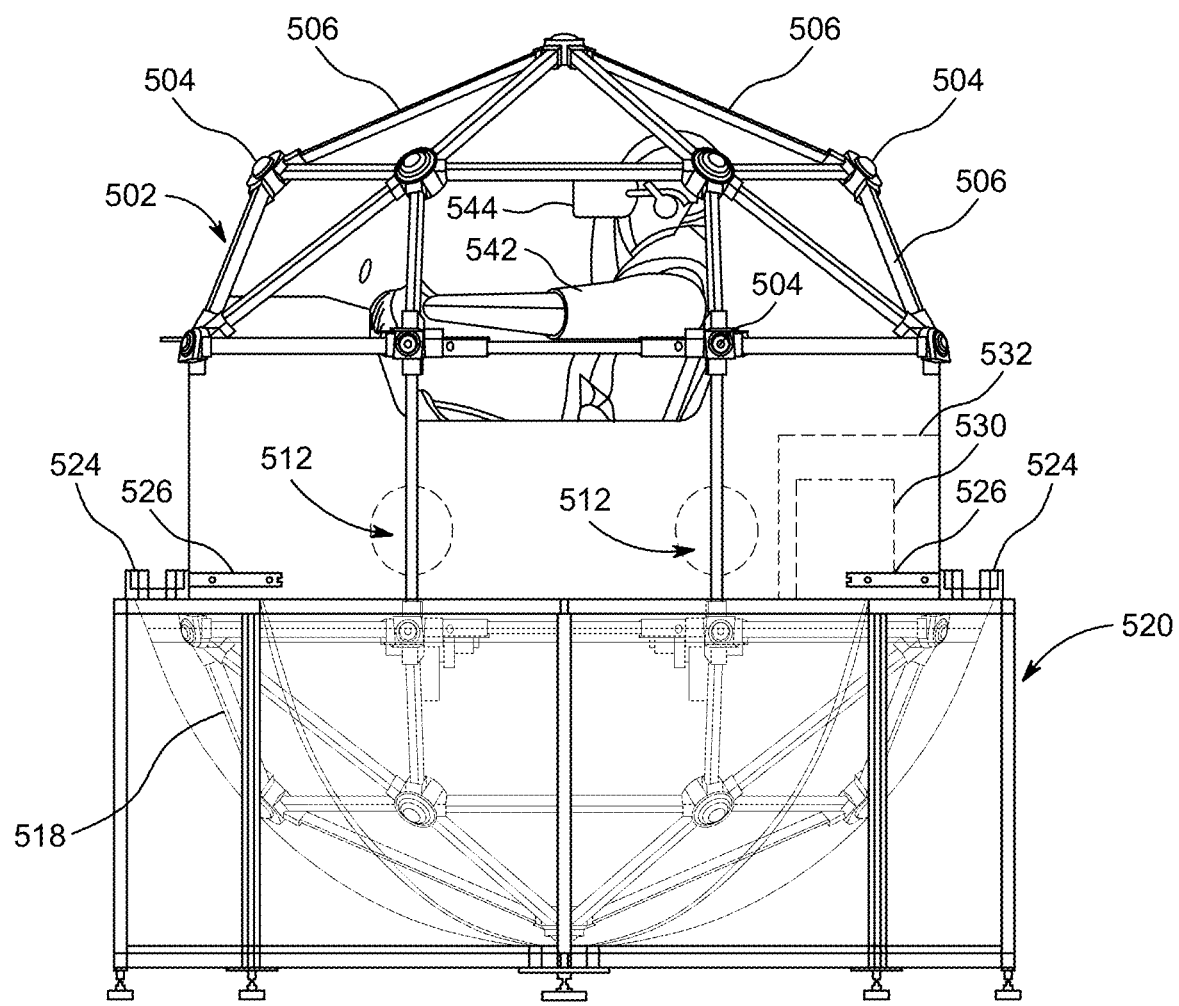
FIG. 8 is a side view of the motion simulation system of FIG. 6 and depicts a nested portion of the frame in accordance with one non-limiting embodiment.

FIGS. 6-8 depicts an example motion simulation system 500 in its operational state with an occupant 542 securely positioned within a seat 540 that is coupled to a frame 502. FIG. 6 provides a perspective view, FIG. 7 provides a top view, and FIG. 8 provides a side view and depicts the nested portion 518 of the frame 502 for illustration purposes. The seat 540 can be equipped with safety features such as harnesses or restraints, as provided above. The frame 502 is rotatable relative to the base 520 thereby allowing a wide range of motion sensations to be generated for the occupant 542. The frame 502 can rotate in multiple axes, allowing for movements that can simulate various scenarios for the occupant 542. Momentum devices 512 of an on-board internal actuator system 510 can selectably generate the required torque vectors to rotate the frame 502 in the desired direction at the desired speed.

In the illustrated embodiment, the occupant 542 is shown wearing a virtual reality (VR) headset 544, thereby providing a fully immersive experience. The VR headset 544 can provide the visual component of the simulation, working in tandem with the physical motions of the frame 502 to create a cohesive and realistic experience. Similar to the frame 402 illustrated in FIG. 5, the frame 502 of the motion simulation system 500 can be formed from a plurality of rigid links 506 that are assembled into a generally spherical shape. While the frame 502 in FIG. 6 is shown as an open-air configuration, in some embodiments the frame 502 can be fully or partially enclosed with panels, walls, or other components. The frame 502 can define an entry portal for ingress and egress by the occupant 542. In the illustrated embodiment, the entry portal includes a removal link 508 that can be removed from the frame 502 to allow the occupant 542 to enter or exit the seat 542.

In some embodiments, the frame 502 can include a battery bay 532 with a battery dock for receiving a battery 530 (see FIG. 8). The battery dock can secure the battery 530 so that it remains in place, even during rapid rotation of the frame 502. In some embodiments, the battery bay 532 is located behind the seat 540, but this disclosure is not so limited.

The frame 502 in the illustrated embodiment includes a plurality of transfer bearings 504 which can be located, for example, at the connection points of the rigid links 506. The base 520 provides a foundation for the rotating frame 502, have a smooth concave surface 522 allowing for smooth, low-friction movement of the frame 502 with the transfer bearings 504 freely rolling along the surface. In this embodiment, the base 520 includes dock rests 524 that are configured to receive docking bars 526 (FIG. 8) that can be selectably extended from the frame 502. When extended, the docking bars impede any rotation of the frame 502. As such, the docking bars can be deployed when an occupant 542 is entering or leaving the frame 502.

Figure 9:
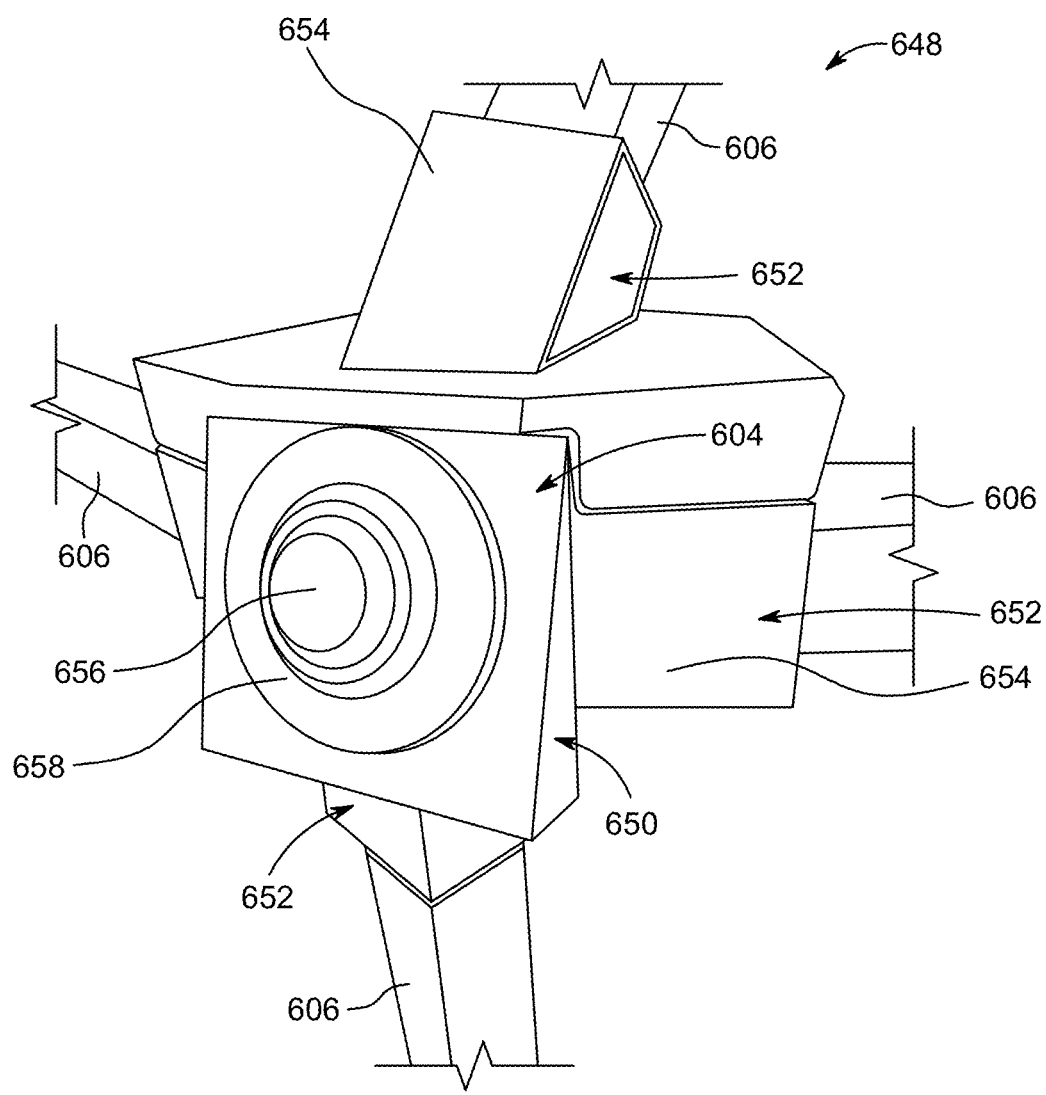
FIG. 9 depicts a vertex coupling of a frame coupled to four rigid links in accordance with one non-limiting embodiment.

In accordance with some embodiments, a frame of a motion simulation system can be assembled using rigid links joined together at vertex couplings. Referring now to FIG. 9, an example vertex coupling 648 is shown which is coupled to four rigid links 606 of an example frame. The vertex coupling 648 can include connectors 652 that are each configured to receive and retain the end of a rigid link 606. In some embodiments, the connectors 652 include flanges 654 that extend outward from a central body 650. The flanges 654 can comprise four sides that collectively define a square shaped port to receive a square shaped rigid link 606. In other embodiments, the connectors 652 may be internal to the central body 650. The central body 650 can also house a transfer bearing 604 that can include a retaining collar 658 and a ball bearing 656. The ball bearing 656 can be fabricated from a high-strength, low-friction material such as chrome steel, stainless steel, or ceramic, chosen for its durability and smooth rotational properties. The retaining collar 658 can securely hold the ball bearing 656 while allowing it to rotate freely. The retaining collar 658 may be constructed from a rigid material such as hardened steel or a high-strength polymer, selected for its ability to withstand the loads and stresses experienced during operation.

As illustrated in FIG. 9, the transfer bearing 604 can be embedded within a component of a motion simulator system. In the illustrated embodiment, the transfer bearing 604 is embedded in the central body 650 of a vertex coupling 648, but similar transfer bearings can be embedded into a concave surface of a base, for example. The central body 650 includes an aperture sized to accommodate the transfer bearing 604. The retaining collar 658 is securely fitted within the aperture, which can be achieved through various means such as press-fitting, adhesive bonding, or mechanical fastening. A portion of the ball bearing 656 extends outward from the outer surface of the central body 650. This configuration allows the exposed portion of the ball bearing 656 to make contact with and roll along a corresponding surface, such as the concave surface of the base in a motion simulator system.

The ball bearing 656 is designed to rotate freely within the retaining collar 658. This rotational freedom is facilitated by a precision-engineered interface between the ball bearing 656 and the retaining collar 658, which may include a spherical raceway or other suitable bearing surface. In some embodiments, the transfer bearing 604 may also include additional components such as seals or shields (not shown) to protect the internal components from contaminants and retain lubricant within the assembly.

Figure 10A:
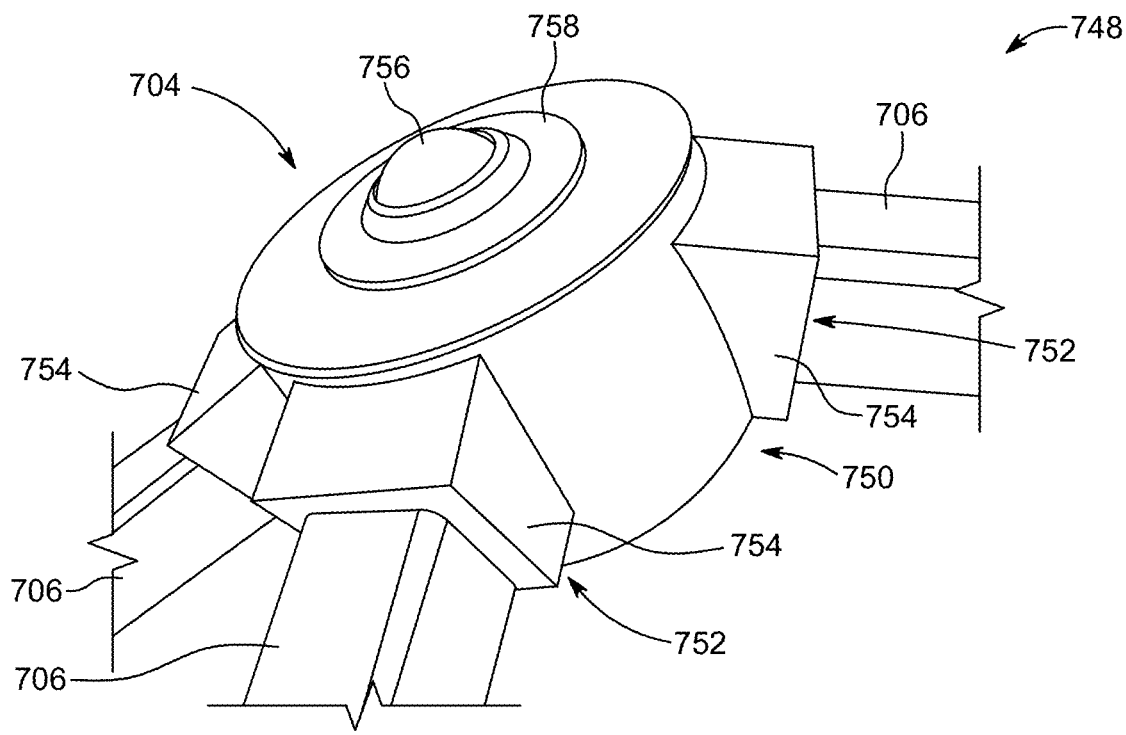
FIGS. 10A-10B depict a vertex coupling of a frame coupled to five rigid links in accordance with one non-limiting embodiment.
Figure 10B:
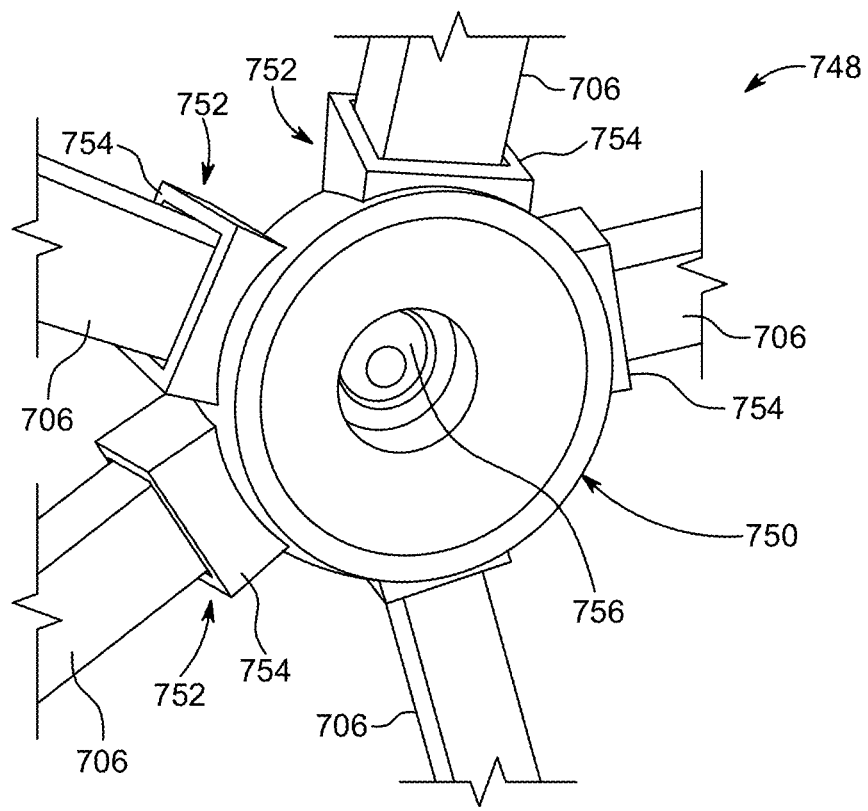

FIGS. 10A-10B, depicts a vertex coupling 748 coupled to five rigid links 706 in accordance with one non-limiting embodiment. Similar to vertex coupling 648, the vertex coupling 748 can include connectors 752 that are each configured to receive and retain the end of a rigid link 706. The connectors 752 can include flanges 754 that extend outward from a central body 750. The flanges 754 can comprise four sides that collectively define a square shaped port to receive a square shaped rigid link 706. As is to be appreciated, the shape and size of the connectors 752 can be selected to match the shape and size of the rigid links. The central body 750 can also house a transfer bearing 704 that can include a collar 758 and a ball bearing 756. In some embodiments, the amount of the bearing 756 that extends outward of the central body 750 can be adjusted, thereby providing for fine tuning adjustment to ensure adequate contact between the bearing 756 and the concave surface of an associated base during operation.

Figure 11:
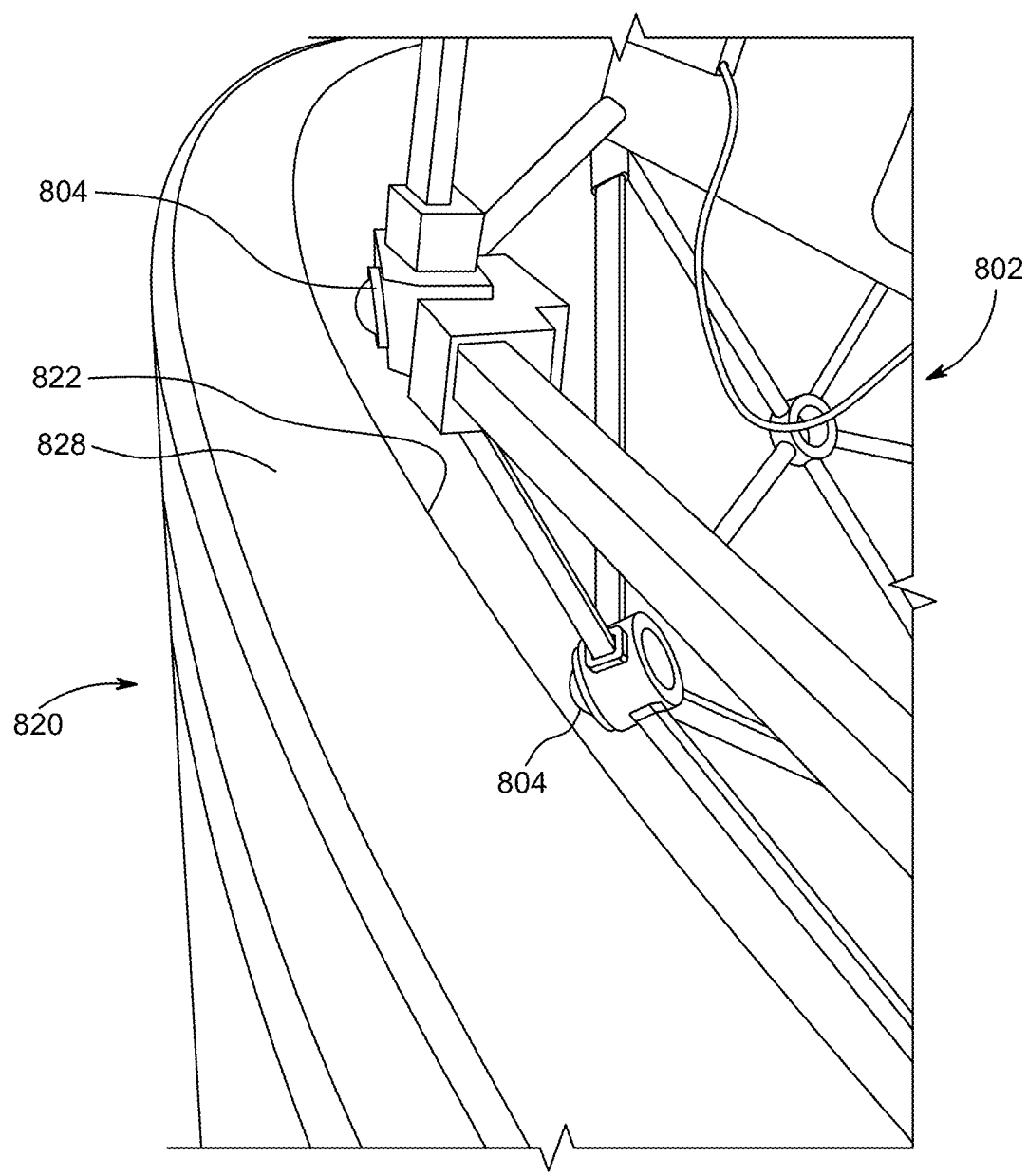
FIG. 11 depicts transfer bearings of a frame engaging with a concave surface of a base in accordance with one non-limiting embodiment.

FIG. 11 depicts an example interface between a frame 802 and a base 820 in accordance with one embodiment, which is configured to enable smooth and controlled motion of the simulator. Transfer bearings 804 are shown as integral components of the frame 802 and they are positioned to engage with concave surface 822 of the base 820 as the frame 802 rotates. The base 820 can include a lip 828 around its periphery. This lip 828 can facilitate the transition into the concave surface 822. In one embodiment, the base 820 includes a variable radius of curvature of the concave surface 822. Proximate to the rim 828, the radius of curvature increases gradually. This design creates a glide path for the transfer bearings 804. More specifically, as the frame 802 rotates and the bearings 804 approach the edge of the base 820, this increasing radius of curvature allows for a smooth and gradual transition of the transfer bearings 804 onto the main concave surface 822.

Figure 12:
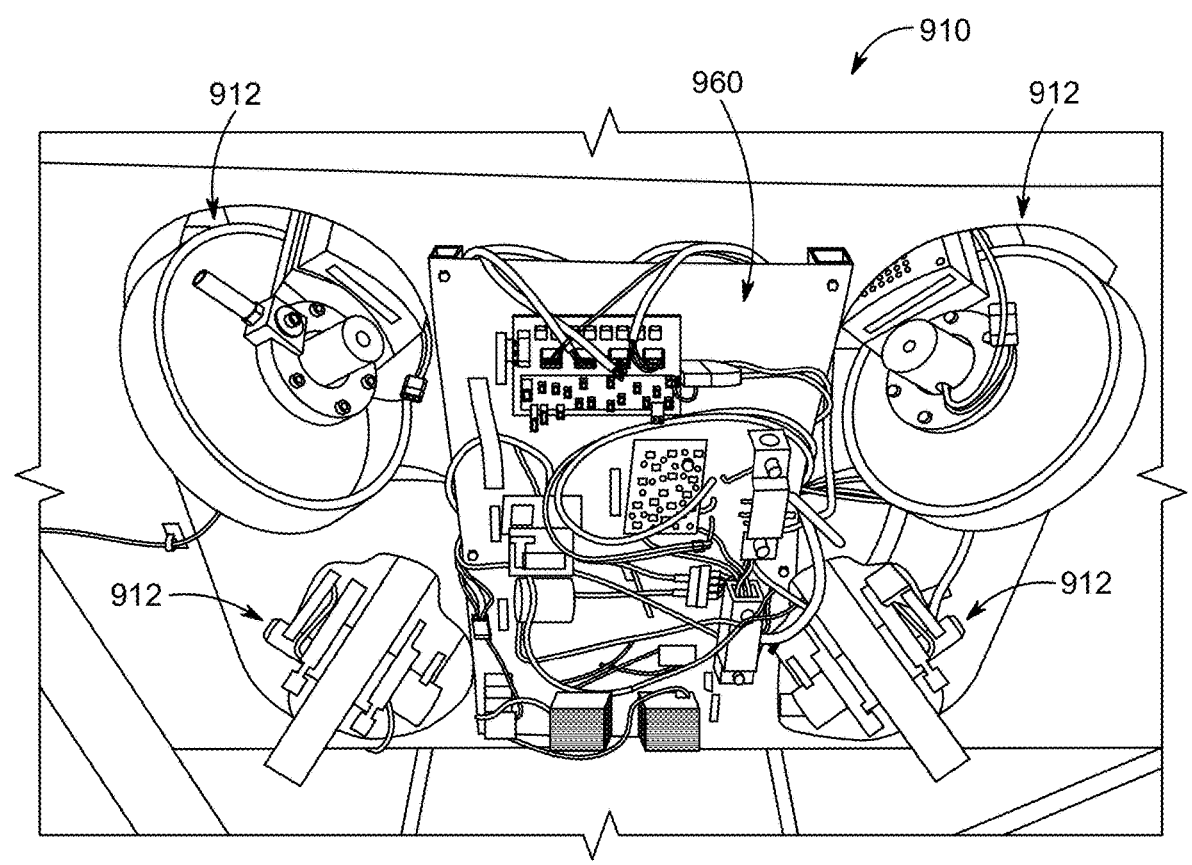
FIGS. 12-13 depict an example internal actuator system having four momentum devices in accordance with one non-limiting embodiment.
Figure 13:
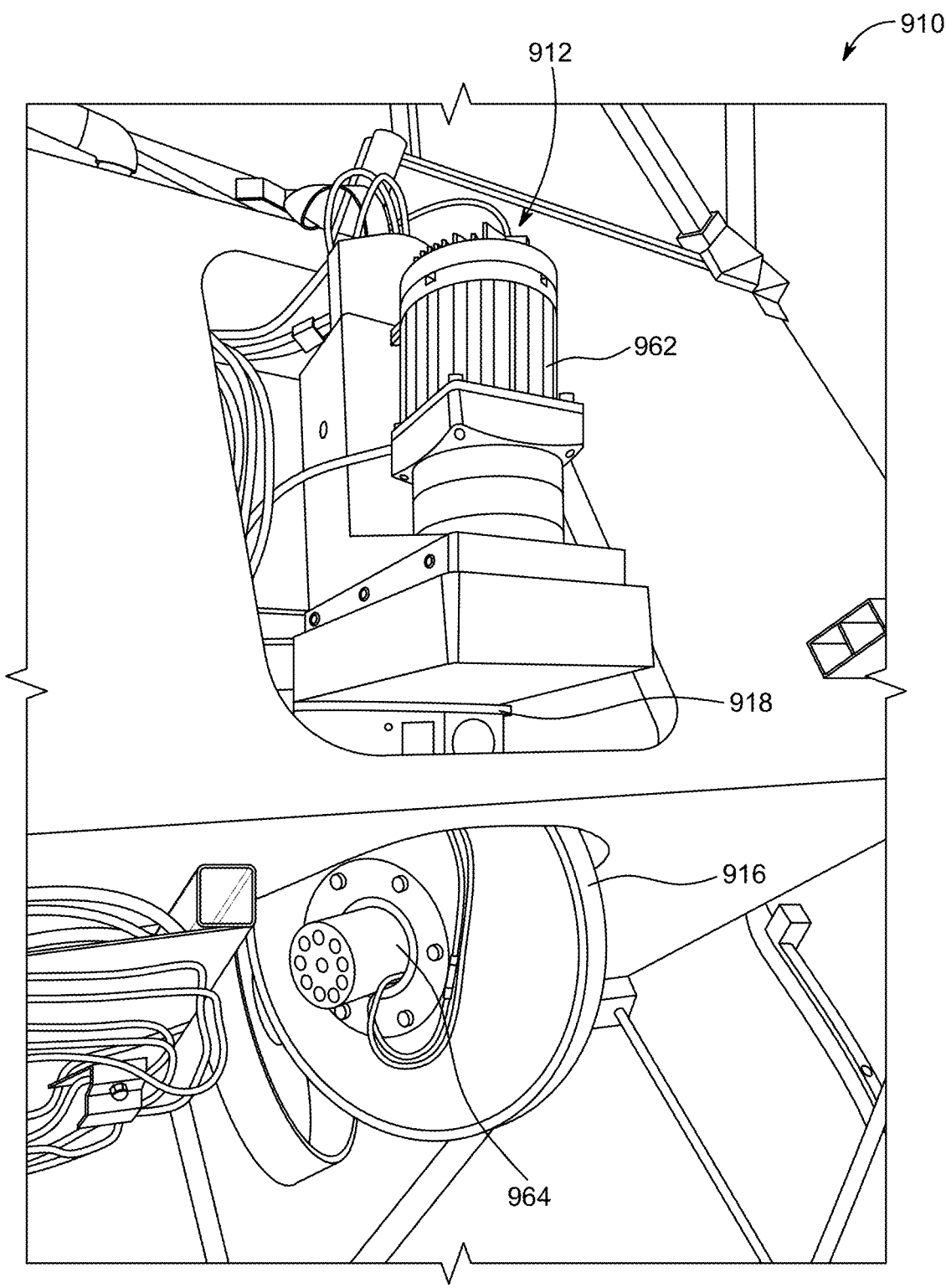
Figure 14:
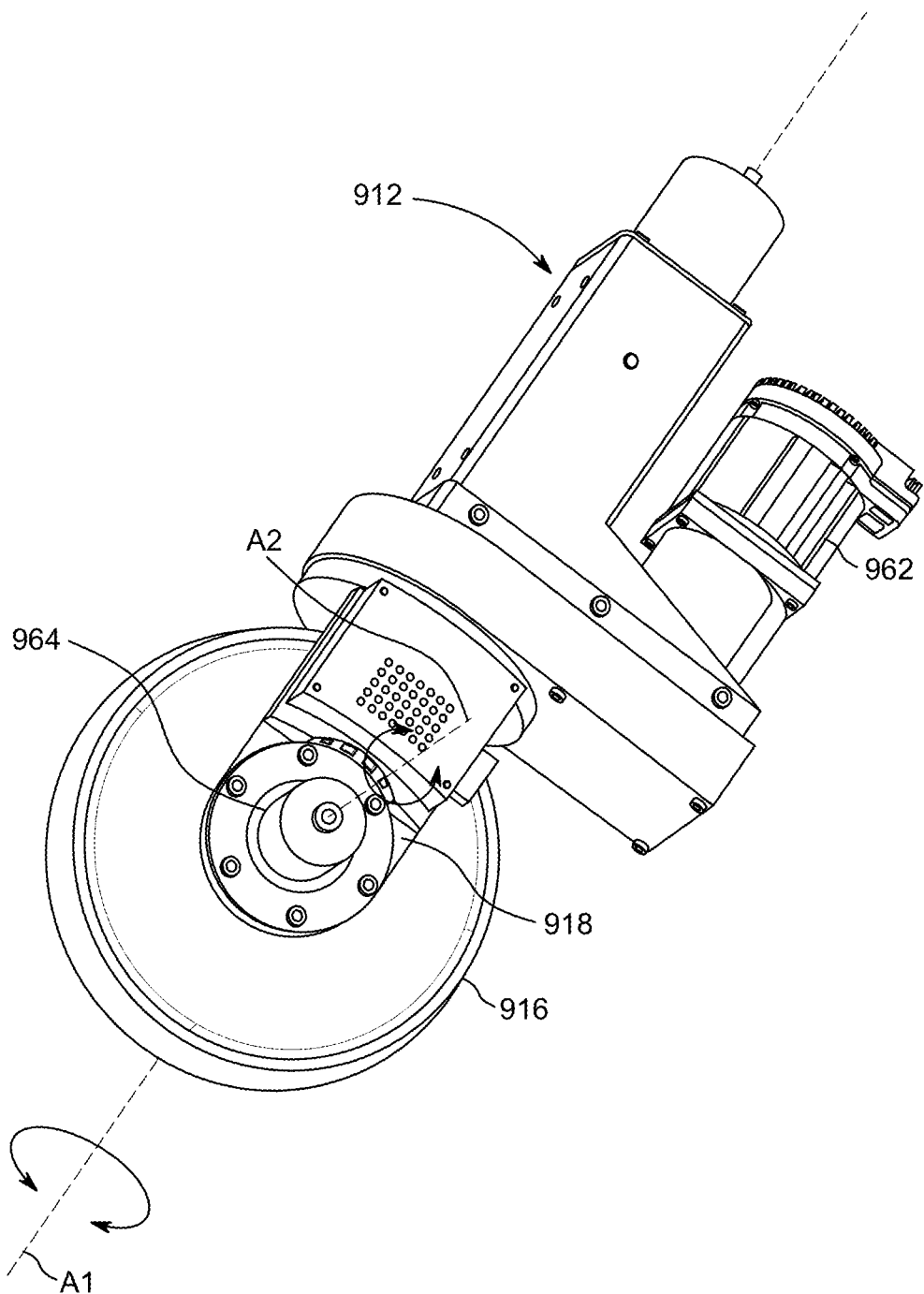
FIG. 14 is a perspective view of a control moment gyro in accordance with one non-limiting embodiment.

Referring now to FIGS. 12-13, an example internal actuator system 910 is depicted having four momentum devices, shown as Control Moment Gyroscopes (CMGs) 912, in accordance with one non-limiting embodiment. FIG. 12 depicts an example arrangement of control circuitry and CMGs 912. FIG. 13 depicts one of the CMGs 912 and shows a flywheel 916 connected to a rotatable gimbal 918. FIG. 14 is a perspective view of one of the CMGs 912, which shows a spinning axis (shown as A2) and a gimbal axis (A1).

Referring first to FIG. 12, control circuitry 960 and the CMGs 912 are shown in one example operational arrangement. The control circuitry 960, while not detailed in this description, can include processor, sensors, and drivers necessary for coordinating the CMGs 912 operations. In some embodiments, the control circuitry 960 utilizes a Controller Area Network (CAN) for communications. FIG. 13 is a detailed view at one of the CMGs 912, which includes a flywheel 916 which is a high-mass, rapidly spinning disk that stores angular momentum and is connected to a rotatable gimbal 918, which allows the flywheel's spin axis to be reoriented. The gimbal's rotation is controlled by a servo motor 962 and a separate servo motor 964, or multiple servos, can spin the flywheel 916. In some embodiments, the flywheel 916 can spin at 6,000 rpm or higher. This high rotational speed stores angular momentum, which provides CMG's ability to generate large torques with relatively small input power. The exact speed of flywheel rotation and gimbal rotation can be determined based on factors such as the desired torque output, power consumption limitations, and so forth. The arrangement of the four CMGs 912, as shown in FIG. 12m can seek to optimize torque generation in all desired directions while minimizing singularities (i.e., configurations where the system loses the ability to generate torque in certain directions).

FIG. 14 is a perspective view of a single CMG 912 and illustrates its two primary axes of operation. The spinning axis (labeled A2) is the axis around which the flywheel 916 rotates at high speed. This axis is fixed relative to the gimbal 918 but can be reoriented in space as the gimbal moves. The gimbal axis (labeled A1) is the axis around which the entire flywheel assembly can be rotated. The interplay between these two axes is what allows the CMG 912 to generate torques in different directions.

When the spinning flywheels 916 are rotated on their gimbal axis A1, a torque is created perpendicular to the plane formed by the flywheel spin axis A2 and gimbal axis A1. The magnitude of the torque is proportional to the flywheel angular momentum and gimbal axis rotational velocity. The selective rotation of the gimbal 918 allows the flywheel's angular momentum vector to be tilted in any desired direction. Accordingly, when the gimbal 918 is rotated, the change in the flywheel's angular momentum vector induces a torque on a frame to which it is coupled. By precisely controlling the gimbal rates of the multiple CMGs 912 of the internal actuator system 910, the movable frame's attitude relative to a base can be accurately adjusted and maintained. The variable speed CMGs 912 can be oriented and controlled to provide a torque vector in any direction up to a maximum magnitude to provide rotational acceleration, velocity and positioning control in any desired direction. Thus, when the movable frame is placed in and supported by the hemispherical base, as described herein, the internal actuator system 910 can allow for unlimited rotation of the movable frame in all three axes of rotation, either individually or simultaneously.

Figure 15:
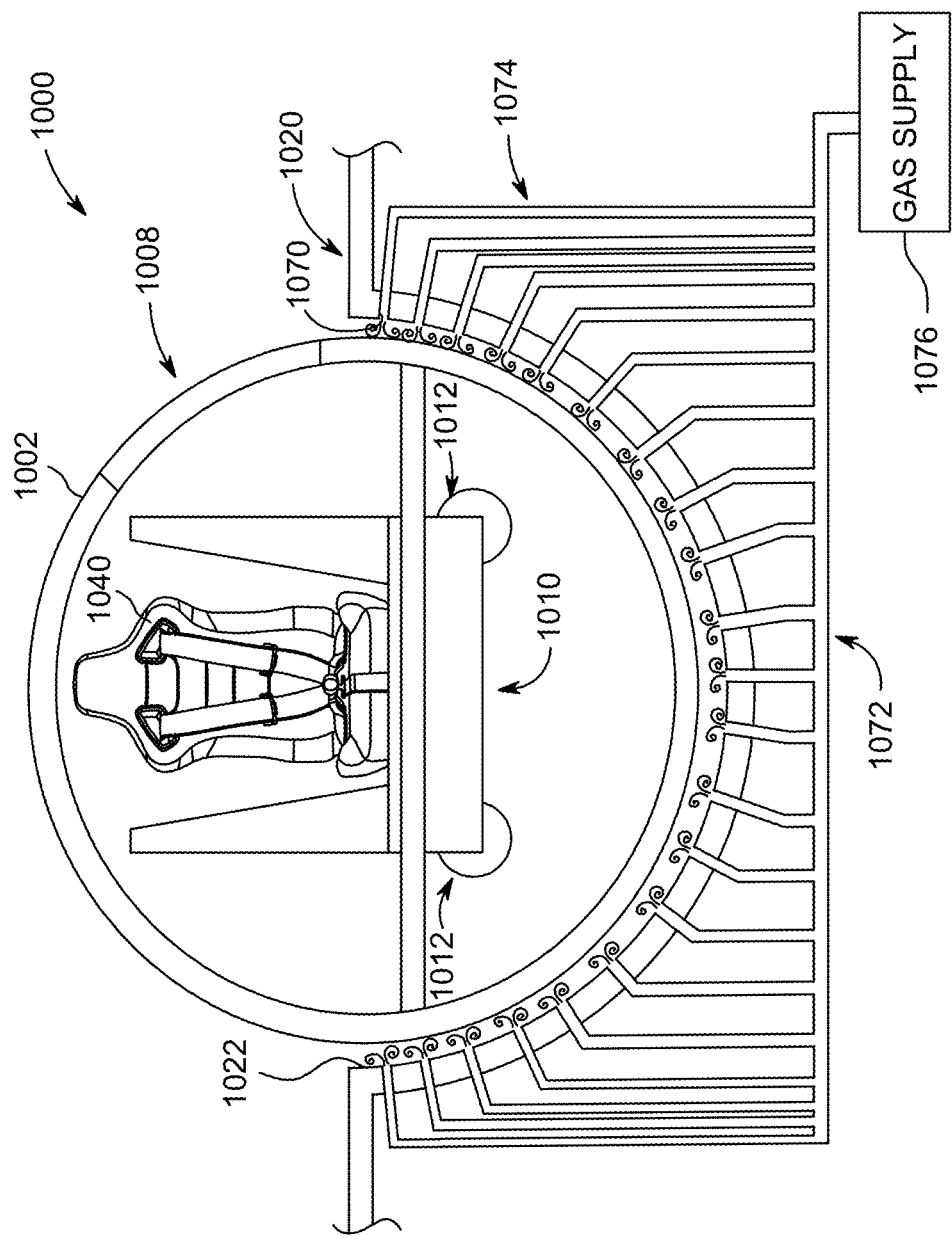
FIGS. 15-16 depict example motion simulation systems that utilize a gas supply system to generate a cushion of air between a base and a frame, in accordance with various non-limiting embodiments.

While some embodiments described herein include low friction structures deployed on the frame of a motion simulation system, this disclosure is not so limited. FIG. 15, for example, depicts an example motion simulation system 1000 that utilizes a gas supply system 1076 to generate a cushion of air between a base 1020 and a frame 1002, thereby creating a low friction engagement. The frame 1002 can include a fully enclosed, or at least partially enclosed, plastic shell with a smooth outer surface to facilitate easy rotation on the base 1022. The spherical shell, can be formed from, for example, two hemispherical panels or multiple smaller doubly-curved panels that collectively form the spherical structure. The frame 1002 can include a door 1008, or other means of ingress and egress. The hemispherical base 1020 can be shaped to nest at least part of the spherical frame 1002 and can defines a concave surface 1022. The base 1020 can incorporate a high number of vent holes 1070 distributed across the concave surface 1022. The motion simulation system 1000 can include a gas supply system that includes a of a gas supply 1076 (such as air pump) connected to a manifold 1072 for even distribution of air. From the manifold 1072, multiple supply lines 1074 connect to each vent hole 1070 in the concave surface 1022. These vent holes 1070 can be distributed across the entire concave surface 1022 and are designed to release air in a controlled manner, creating an even air cushion between the frame 1022 and the base 1020.

During operation of the motion simulator system 1000, the gas supply 1076 can force air through the manifold 1072 and into each of the supply lines 1074. The air then exits through the vent holes 1070 in the concave surface 1022 creating a thin, uniform cushion of air between the frame 1002 and the base 1020. The frame 1002, containing an internal actuator system 1010, momentum devices 1012, and a seat 1040, for example, rests on this air cushion. The continuous flow of air through the vent holes 1070 maintains a small gap between the frame 1002 and the base 1020, effectively eliminating direct contact and friction between the two surfaces.

Figure 16:
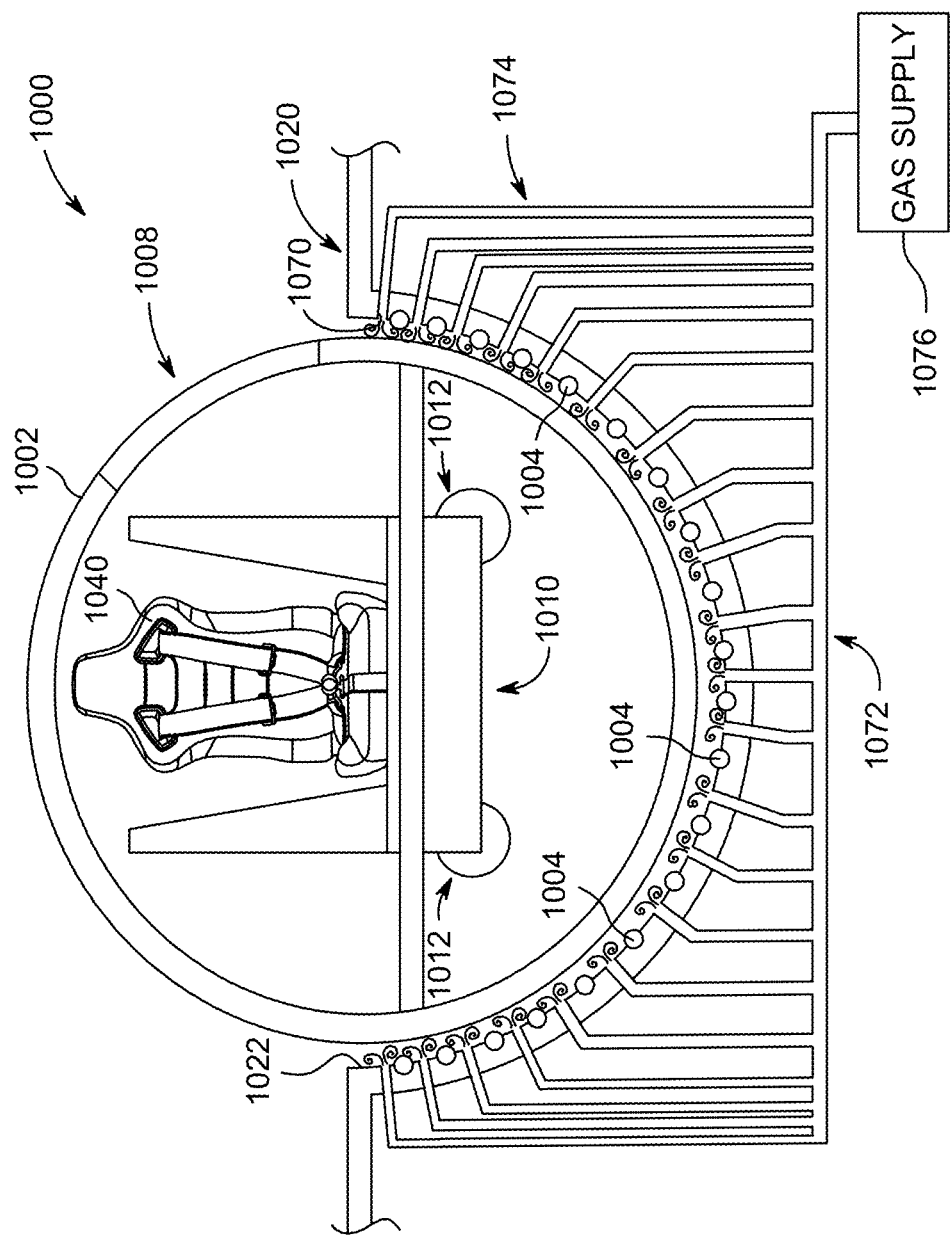

FIG. 16 depicts the motion simulation system 1000 but includes additional low friction structures. Namely, a plurality of transfer bearings 1004 are also embedded in the concave surface 1022. Thus, the transfer bearings 1004 and the air cushion generated by the gas supply system 1076 act in concert to reduce the overall friction between the frame 1002 and the concave surface 1022 during operation of the motion simulation system 1000. The transfer bearings 1004 can be interspersed among the vent holes 1070 and mounted slightly proud of the concave surface 1022, allowing them to make contact with the frame 1002 while still permitting the air cushion to form effectively. The bearings 1004 can be positioned in a pattern that ensures even support of the frame 1002, regardless of its orientation.

Figure 17:
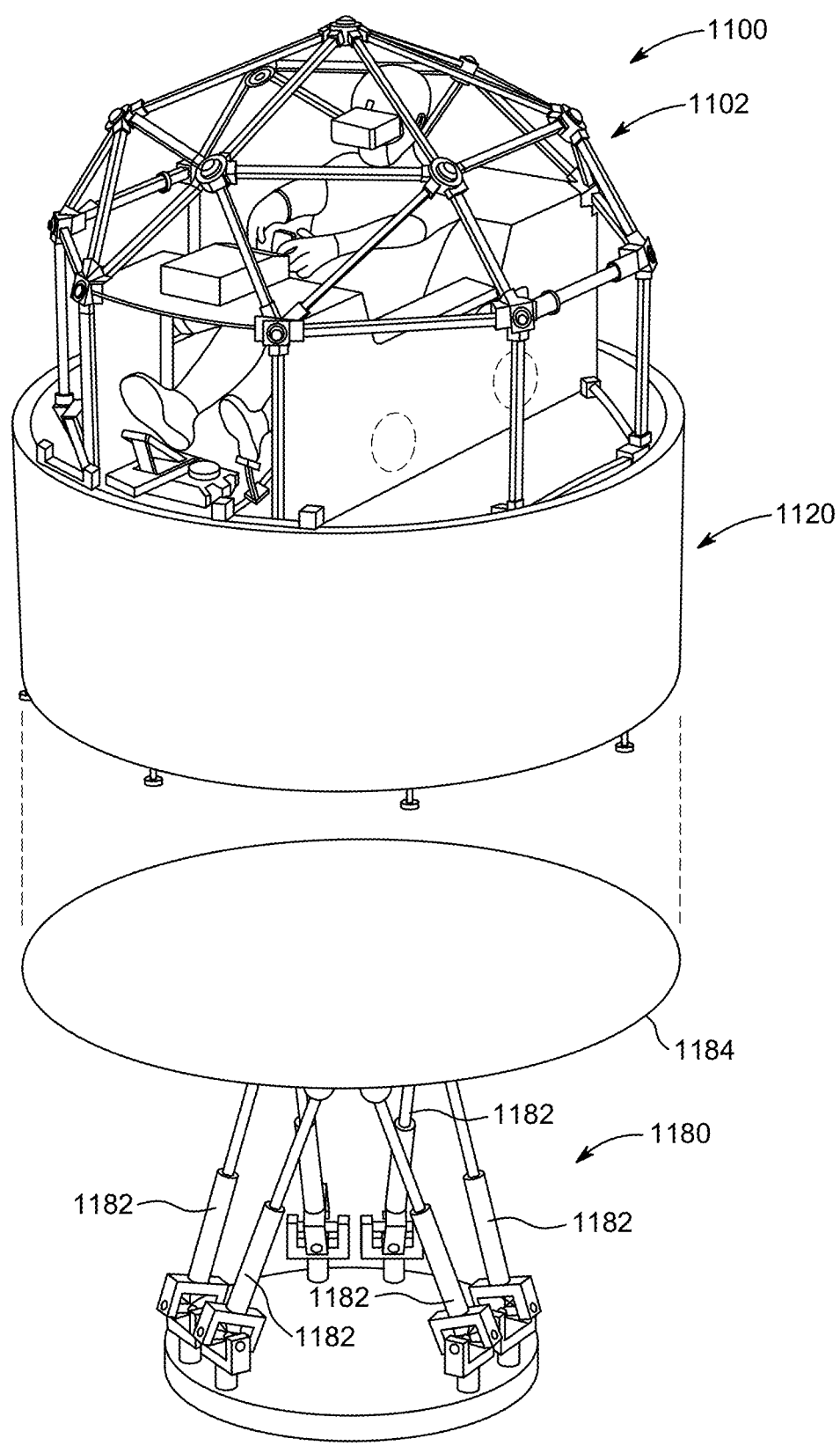
FIG. 17 depicts a motion simulator system configured to provide three linear degrees of freedom (DOFs) in addition to the rotational DOFs in accordance with a non-limiting embodiment.

Referring now to FIG. 17, a motion simulator system 1100 configured to provide three linear degrees of freedom (DOFs) in addition to the rotational DOFs is depicted. A base 1120 of the motion simulator system 1100 can be attached to a plate 1184 of a manipulator 1180. The manipulator 1180 can include six linear actuator 1182 positioned between the base and a ground plate or other supporting structure. In some embodiments, the manipulator 1180 is arranged as a Gough-Stewart hexapod. As shown, the six linear actuators 1182 can be arranged in pairs, with each pair coupled to the base 1120 and a ground plate through universal joints or ball-and-socket joints. This configuration allows the base 1120, and a movable frame 1102 nested therein, to have additional DOFs, including up to three translational movements (surge, sway, and heave). By incorporating all six degrees of freedom, the motion simulator system 1100 can recreate a wider range of motion cues and provide a more accurate representation of the simulated environment.

Figure 18:
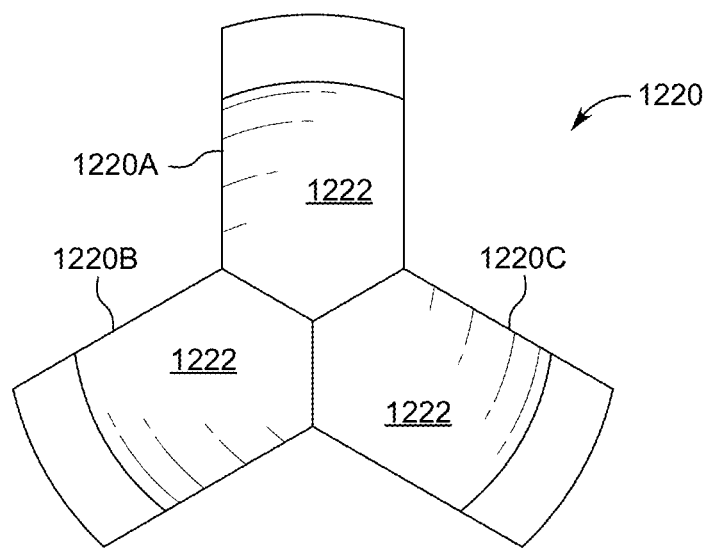
FIG. 18 is a top view of an example base of a motion simulator system having multiple extensions in accordance with one non-limiting embodiment.

While some embodiments of the base depicted herein show a base with a contiguous hemispherical surface, this disclosure is not limited to such configurations. Instead, a base of a motion simulator system can be provided in any of a variety of different configurations that adequately support a frame and allow for the frame to freely rotate with respect to the base. By way of example, FIG. 18 is a top view of an example base 1220 for a motion simulator system that does not have a contiguous hemispherical surface. As shown, the base 1220 has a more open and segmented structure. The base 1220 includes three extensions, shown as 1220A, 1220B, and 1220C, that extend outwardly from a central point.

Each of these extensions defines a concave surface 1222 that collectively form a discontinuous support structure for a rotatable frame. The concave surfaces 1222 on each extension 1220A-C can be engineered to closely match the curvature of the frame they are designed to support. The spaces between the extensions 1220A-C can offer several advantages, such as reduced material usage, improved ventilation, and easier access to various components. While the base 1220 in FIG. 18 is depicted with three extensions, it should be understood that this disclosure is not so limited, as other embodiments may incorporate a different quantity of extensions in the base. The number, size, and arrangement of these extensions can be selected based on factors such as the weight and size of the frame, desired stability, manufacturing considerations, and the specific motion capabilities required of the simulator.

Figure 19:
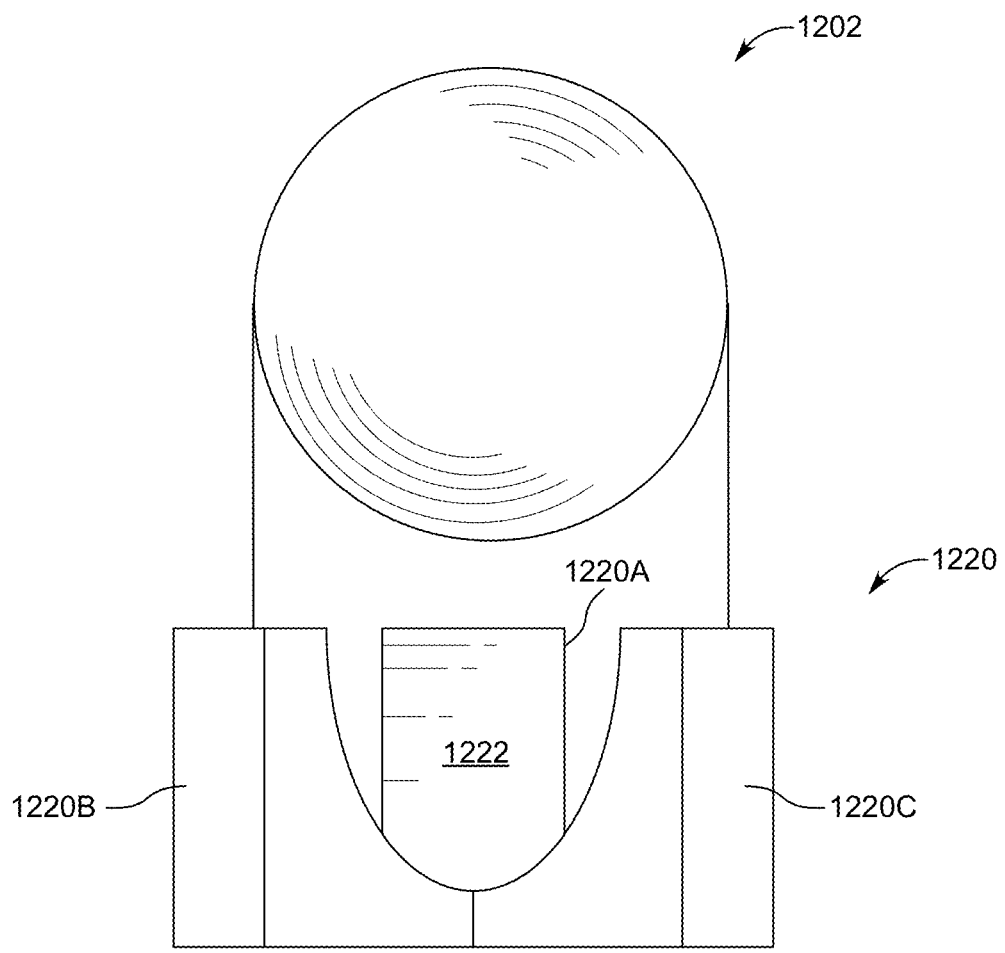
FIG. 19 is an exploded side view of the base of FIG. 18 configured to support an example frame in accordance with one non-limiting embodiment.

FIG. 19 is an exploded side view of the base 1220, illustrating how it is configured to receive an example frame 1202. As shown, the curved surfaces of the extensions 1220A-C collectively support the spherical frame 1202. While not shown in FIGS. 18-19, the frame 1202 and/or the base 1220 can incorporate various low friction structures to enable smooth rotation of the frame 1202 relative to the base 1220.

Figure 20:
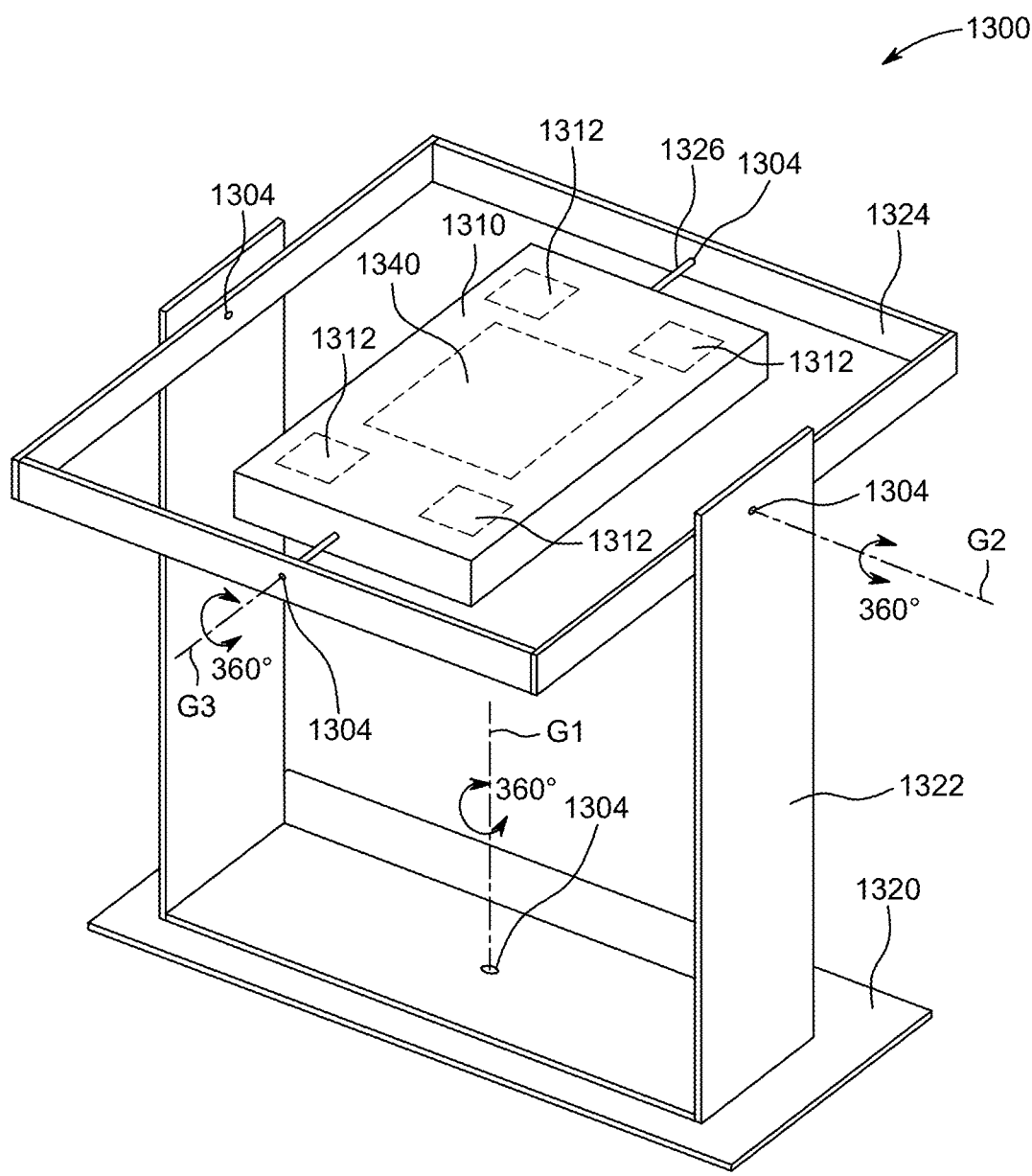
FIG. 20 depicts an isometric view of a motion simulator system with nested gimbal frames in accordance with one non-limiting embodiment.

Referring now to FIG. 20, another example motion simulator system 1300 is schematically depicted in accordance with a non-limiting embodiment. The motion simulator system 1300 can include a base 1320 and a plurality of nested gimbal frames coupled to the base 1320. The nested gimbal frames can comprise an outer gimbal frame 1322, an intermediate gimbal frame 1324, and an inner gimbal frame 1326. The outer gimbal frame 1322 can be rotatably coupled to the base 1320 along an outer gimbal frame axis G1. The intermediate gimbal frame 1324 can be rotatably coupled to the outer gimbal frame 1322 along an intermediate gimbal frame axis G2. The inner gimbal frame 1326 can be rotatably coupled to the intermediate gimbal frame 1324 along an inner gimbal frame axis G3. This arrangement can allow the inner gimbal frame 1326 to rotate relative to the base 1320 about three orthogonal axes.

The three orthogonal axes G1, G2, and G3 can be arranged perpendicular to each other, creating a three-dimensional coordinate system that enables the motion simulator system 1300 to achieve rotation in any direction within three-dimensional space. Each gimbal frame is designed with sufficient structural rigidity to maintain its shape under dynamic loading conditions while being lightweight enough to minimize inertial resistance during rotational movements. The nested configuration of the gimbal frames ensures that rotation about any one axis does not interfere with the ability to rotate about the other axes, thereby providing independent control over each rotational degree of freedom. This design allows for complex motion patterns that can accurately simulate various vehicle dynamics, including aircraft maneuvers, for example, or other scenarios requiring sophisticated motion reproduction.

Bearings 1304, or other types of low-friction devices, can be provided between the gimbal frames and the base 1320 to facilitate rotation. The bearings 1304 can allow for smooth rotational movement of the nested gimbal frames. These bearings 1304 can include, without limitation, precision ball bearings, roller bearings, or other specialized low-friction components designed to minimize rotational resistance while maintaining structural integrity under various load conditions. As shown, the bearings 1304 can be positioned at the connection points between adjacent gimbal frames (between outer gimbal frame 1322 and intermediate gimbal frame 1324, and between intermediate gimbal frame 1324 and inner gimbal frame 1326) as well as between the outer gimbal frame 1322 and the base 1320. This arrangement enables the unrestricted 360-degree rotation about each of the three orthogonal axes (G1, G2, and G3), while reducing energy requirements for actuation by the internal actuator system 1310.

An internal actuator system 1310, similar to the various internal actuator systems described above, for example, can be coupled to the inner gimbal frame 1326. The internal actuator system 1310 can comprise a plurality of momentum devices 1312 that are configured to produce controllable torque vectors to selectively induce rotation of the gimbal frames about their respective axes. In some cases, the momentum devices 1312 may include, but are not limited to, control moment gyros (CMGs). The CMGs may utilize the principle of angular momentum exchange to generate large output torques for attitude control of the nested gimbal frames. The internal actuator system 1310 can be powered by on-board batteries coupled to the inner gimbal frame 1326.

In some embodiments, the motion simulator system 1300 may include various mounting structures or platforms that are configured to support and accommodate different objects or payloads 1340. While one or more seats may be coupled to the inner gimbal frame 1326 to accommodate one or more users during operation of the motion simulator system 1300, other embodiments may utilize alternative mounting configurations. For instance, a motion simulator system 1300 in accordance with the present disclosure can be configured to carry a camera rig for filmmaking purposes or to assess the behavior of various equipment or products under dynamic conditions. As is to be appreciated, the specific mounting structure or platform employed in such embodiments can be tailored to the particular application and the requirements of the objects being mounted on the motion platform.

While the motion simulator systems illustrated herein depict a single seat arrangement, such illustrations merely serves as representative non-limiting example arrangement. It is important to note that the scope of the present disclosure is not limited to motion simulator systems with a single seat configuration. In other embodiments, for example, the motion simulator system can be designed to accommodate multiple seats, allowing for the simultaneous motion simulation experience for a larger number of users. This multi-seat arrangement can be particularly useful in applications such as theme park rides, training simulators, or virtual reality experiences where multiple participants are involved. Moreover, the presence of a seat is not a requirement for all motion simulator systems within the scope of the present disclosure, as in certain embodiments the motion simulator system may not include a seat at all. Instead, these embodiments may include other mounting structures or platforms that are configured to support and accommodate different objects or payloads. For instance, a motion simulator system in accordance with the present disclosure can be configured to carry a camera rig for filmmaking purposes or to assess the behavior of various equipment or products under dynamic conditions. As is to be appreciated, the specific mounting structure or platform employed in such embodiments can be tailored to the particular application and the requirements of the objects being mounted on the motion platform. As such, motion simulator systems in accordance with the present disclosure can have a wide range of applications and use cases, catering to diverse industries and user needs and FIGS. 1-20 should be regarded as illustrative and should not be construed as being limited to the specific embodiments depicted therein.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A motion simulator system, comprising:
a base defining a concave surface;
a frame, wherein the frame rests on the concave surface of the base, wherein the frame comprises a plurality of transfer bearings disposed on an outer periphery of the frame, wherein the plurality of transfer bearings engages with the concave surface of the base, wherein the frame defines an interior region; and
an internal actuator system coupled to the frame and positioned within the interior region, wherein the internal actuator system comprises a plurality of momentum devices, wherein controllable torque vectors generated by the plurality of momentum devices collectively produce a resultant torque vector that is selectively variable in magnitude and direction, and wherein the resultant torque vector is operable to cause continuous and dynamic rotation of the frame simultaneously about each of the three rotational degrees of freedom.

2. The motion simulator system of claim 1, wherein the frame is substantially spherical.

3. The motion simulator system of claim 2, wherein the frame comprises a plurality of rigid links and a plurality of vertex couplings, wherein each one of the plurality of transfer bearings is coupled to a respective one of the plurality of vertex couplings.

4. The motion simulator system of claim 3, wherein the plurality of rigid links is connected in a geodesic structure.

5. The motion simulator system of claim 1, wherein the frame comprises a spherical shell, wherein the spherical shell comprises two or more panels that fit together to form the spherical shell.

6. The motion simulator system of claim 1, further comprising at least one seat coupled to the frame and positioned within the interior region.

7. The motion simulator system of claim 1, wherein the frame comprises a plurality of interlocking exterior panels that form a substantially enclosed sphere.

8. The motion simulator system of claim 1, wherein a first subset of the plurality of transfer bearings is engaged with the concave surface when the frame is in a first position relative to the base and a second subset of the plurality of transfer bearings is engaged with the concave surface when the frame is in a second position relative to the base.

9. The motion simulator system of claim 1, wherein the frame is substantially spherical and defines a frame radius, and wherein the concave surface of the base is substantially hemispherical and defines a base radius, wherein the base radius is substantially equal to the frame radius.

10. The motion simulator system of claim 1, wherein each of the plurality of momentum devices is a control moment gyro (CMG), wherein each of the CMGs comprises a spinning flywheel mounted on a gimbal frame and rotatable about a gimbal axis, wherein each of the plurality of CMGs creates an angular momentum vector in a spin axis of the spinning flywheel, wherein rotation of the spinning flywheel about the gimbal axis creates a torque perpendicular to a plane formed by the flywheel spin axis and gimbal axis.

11. The motion simulator system of claim 1, wherein each of the plurality of momentum devices is a control moment gyro, a reaction wheel, a magnetorquer, a fluidic momentum controller, or a driving wheel.

12. The motion simulator system of claim 1, wherein the internal actuator system comprises a power source positioned in the interior region.

13. The motion simulator system of claim 1, wherein the frame is selectably rotatable relative to the base in coordination with simulated operation of a vehicle.

14. The motion simulator system of claim 13, wherein the vehicle is an aircraft, spacecraft, military craft, automobile, marine craft, or amusement ride.

15. A motion simulator system, comprising:
a base defining a surface;
a frame, wherein the frame is spherical, and a portion of the frame is nested within the base with a low friction engagement, wherein the frame is untethered from the base and rotatable relative to the base in three rotational degrees of freedom; and
an internal actuator system coupled to an interior region of the frame, wherein the internal actuator system comprises a plurality of momentum devices, wherein controllable torque vectors generated by the plurality of momentum devices collectively produce a resultant torque vector that is selectively variable in magnitude and direction, to selectably rotate the frame with continuous and dynamic rotation simultaneously about each of the three rotational degrees of freedom.

16. The motion simulator system of claim 15, further comprising a plurality of transfer bearings providing an interface between the frame and the surface of the base.

17. The motion simulator system of claim 16, wherein the plurality of transfer bearings is coupled to the frame.

18. The motion simulator system of claim 16, wherein the plurality of transfer bearings is coupled to the surface of the base.

19. The motion simulator system of claim 15, comprising a high-pressure gas delivery system, wherein the surface of the base is curved and defines a plurality of vent holes, wherein high pressure gas is vented through the plurality of vent holes, wherein the frame is substantially enclosed and rides on an air cushion generated by the high-pressure gas delivery system.

20. A motion simulator frame, comprising:
a plurality of rigid links;
a plurality of vertex couplings, wherein each of the vertex couplings comprises a central body and a plurality of connectors around the periphery of the central body, wherein each of the connectors receives an end of one of the plurality of rigid links, wherein the plurality of rigid links collectively form a spherical frame, wherein the spherical frame defines an interior region;
a plurality of transfer bearings, wherein each one of the plurality of transfer bearings is coupled to a respective central body of each of the plurality of vertex couplings;
an internal actuator system positioned within the interior region, wherein the internal actuator system comprises a plurality of momentum devices that collectively produce a resultant torque vector that is selectively variable in magnitude and direction to cause continuous and dynamic rotation of the frame simultaneously about each of the three rotational degrees of freedom; and
at least one seat positioned within the interior region and coupled to the internal actuator system.

\* \* \* \* \*